(12) United States Patent
Pang et al.

(10) Patent No.: US 9,756,354 B2
(45) Date of Patent: Sep. 5, 2017

(54) BLOCK VECTOR PREDICTOR FOR INTRA BLOCK COPYING

(71) Applicant: QUALCOMM Incorporated, San Diego, CA (US)

(72) Inventors: Chao Pang, San Diego, CA (US); Ying Chen, San Diego, CA (US); Joel Sole Rojals, La Jolla, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 186 days.

(21) Appl. No.: 14/658,754

(22) Filed: Mar. 16, 2015

(65) Prior Publication Data

US 2015/0264386 A1 Sep. 17, 2015

Related U.S. Application Data

(60) Provisional application No. 61/954,527, filed on Mar. 17, 2014, provisional application No. 61/971,417, filed on Mar. 27, 2014, provisional application No. 62/000,445, filed on May 19, 2014.

(51) Int. Cl.
| | |
|---|---|
| *H04N 7/12* | (2006.01) |
| *H04N 19/513* | (2014.01) |
| *H04N 19/70* | (2014.01) |
| *H04N 19/44* | (2014.01) |
| *H04N 19/52* | (2014.01) |
| *H04N 19/593* | (2014.01) |
| *H04N 19/463* | (2014.01) |

(52) U.S. Cl.
CPC ........... *H04N 19/513* (2014.11); *H04N 19/44* (2014.11); *H04N 19/463* (2014.11); *H04N 19/52* (2014.11); *H04N 19/593* (2014.11); *H04N 19/70* (2014.11)

(58) Field of Classification Search
CPC ..................................................... H04N 19/52
See application file for complete search history.

(56) References Cited

PUBLICATIONS

Response to Written Opinion dated May 28, 2015, from International Application No. PCT/US2015/021024, filed on Jan. 15, 2016, 7 pp.
Second Written Opinion from International Application No. PCT/US2015/021024, dated Apr. 14, 2016, 13 pp.

(Continued)

*Primary Examiner* — Young Lee

(57) ABSTRACT

An example method for decoding video data includes constructing a block vector (BV) candidate list for a current block of the video data, the BV candidate list including a plurality of BV predictor candidates, each respective BV predictor candidate of the plurality of BV predictor candidates is one of: a BV of a neighboring block, a BV of a previously coded block, and a default BV; determining, based on a syntax element obtained from an encoded video bitstream, a particular BV predictor candidate from the plurality of BV predictor candidates; determining, based on the particular BV predictor candidate, a value of a BV that represents a displacement between the current block and a predictor block of video data in a picture in which the current block resides; determining, based on the value the BV, the predictor block; and reconstructing the current block based on the predictor block.

24 Claims, 9 Drawing Sheets

(56) References Cited

PUBLICATIONS

He Y., et al., "Non-CE2: improved inter merge for unified IBC and inter framework", 20, JCT-VC Meeting; Feb. 10 through 18, 2015; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-T0117, pp. 1-7, XP030117263.

He Y., et al., "Non-SCCE1: Improved intra block copy coding with block vector Derivation," 18. JCT-VC Meeting; Jun. 30 through Jul. 19, 2014; Sapporo, JP; (Joint Collaborative Team on Video Coding of ISO/IEC JTC1/SC29/WG11 and ITU-T SG.16); URL: http://wftp3.itu.int/av-arch/jctvc-site/, No. JCTVC-R0165, Jun. 21, 2014, XP030116449, 8 pages.

International Search Report and Written Opinion from International Application No. PCT/US2015/021024, dated May 28, 2015, 14 pp.

Ma J., et al., "Enhanced block vector predictor list construction for Intra block copy," 19. JCT-VC Meeting; Oct. 17 through 24, 2014 ; Strasbourg, FR; (Joint Collaborative Team on Video Coding of ISO/IEC JTC1/SC29/WG11 and ITU-T SG.16); URL: http://wftp3.itu.int/av-arch/jctvc-site/, No. JCTVC-S0093, Oct. 8, 2014, XP030116837, 4 pages.

Pang C., et al., "Block vector prediction method for Intra block copy", 17, JCT-VC Meeting; Mar. 27 through Apr. 4, 2014; Valencia, ES; (Joint Collaborative Team on Video Coding of ISO/IEC JTC1/SC29/WG11 and ITU-T SG.16); URL: http://wftp3.itu.int/av-arch/jctvc-site/,No. JCTVC-Q0114-v3, pp. 1-3, XP030116035.

Pang C., et al., "Non-CE2: Block vector prediction method for intra block copy", 20, JCT-VC Meeting; Feb. 10 through 18, 2015; Geneva; (Joint Collaborative Team on Video Coding of ISO/IEC JTC1/SC29/WG11 and ITU-T SG.16); URL: http://wftp3.itu/int/av-arch/jctvc-site/, No. JCTVC-T0097-v2, pp. 1-4, XP030117234.

Pang C., et al., "Non-CE2: Zero merging candidates derivation for Intra BC/Inter signalling unification", 20, JCT-VC Meeting; Feb. 10 through 18, 2015; Geneva; (Joint Collaborative Team on Video Coding of ISO/IEC JTC1/SC29/WG11 and ITU-T SG.16); URL: http://wftp3.itu/int/av-arch/jctvc-site/, No. JCTVC-T0098, pp. 1-4, XP030117235.

Pang C., et al., "Non-RCE3: Intra Motion Compensation with 2-D MVs", 14. JCT-VC Meeting; Jul. 25 through Aug. 2, 2013; Vienna; (Joint Collaborative Team on Video Coding of ISO/IEC JTC1/SC29/WG11 and ITU-TSG . 16) ; URL : http://wftp3.itu.int/av-arch/jctvc-site/,, No. JCTVC-N0256-v4, pp. 1-12.

Pang C., et al., "Non-SCCE1: Combination of JCTVC-R0185 and JCTVC-R0203", 18, JCT-VC Meeting; Jun. 30 through Jul. 9, 2015 ; Sapporo (Joint Collaborative Team on Video Coding of ISO/IEC JTC1/SC29/WG11 and ITU-T SG.16); URL: http://wftp3.itu.int/av-arch/jctvc-site/, No. JCTVC-R0309-v5, XP030116626, 7 pages.

Xu J., et aL, "Non-RCE3: Bv coding with default predictor", 16. JCT-VC Meeting; Jan. 9 through 17, 2014; San Jose; (Joint Collaborative Team on Video Coding of ISO/IEC JTC1/SC29/WG11 and ITU-T SG.16); URL: http://wftp3.itu.int/av-arch/jctvc-site/, No. JCTVC-P0178, pp. 1-6, XP030115705.

Xu X., et al., "CE: Test 7 Combination of Test 1 and", 20, JCT-VC Meeting; Feb. 10 through 18, 2015, Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-T0075, pp. 1-6, XP030117204.

Xu X., et al., "Non-CE2: Intra BC merge mode with default candidates", 19, JCT-VC Meeting; Oct. 17 through 24, 2014; Strasbourg; (Joint Collaborative Team on Video Coding of ISO/IEC JTC1/SC29/WG11 and ITU-T SG.16); URL: http://wftp3.itu/int/av-arch/jctvc-site/, No. JCTVC-S0123-v2, pp. 1-7, XP030116884.

Zhu L., et al., "Initialization of block vector predictor for intra block copy", 16, JCT-VC Meeting; Jan. 9 through 17, 2014; San Jose; (Joint Collaborative Team on Video Coding of ISO/IEC JTC1/SC29/WG11 and ITU-T SG.16); URL: http://wftp3.itu.int/av-arch/jctvc-site/, No. JCTVC-P0217, pp. 1-6, XP030115758.

Joshi, Rajan, et al., "High Efficiency Video Coding (HEVC) Screen Content Coding: Draft 1", 18, JCT-VC Meeting; Jun. 30 through Jul. 9, 2014; Sapporo, JP; (Joint Collaborative Team on Video Coding (JCT-VC) of ITU-T SG 16 WP3 and ISO/IEC JTC 1/SC 29/WG 11); URL: http://wftp3.itu.int/av-arch/jctvc-site/, No. JCTVC-R1005-v3, 362 pp.

Pang, Chao, et al., "Non-RCE3: Block vector signaling for intra block copy", 16. JCT-VC Meeting: Jan. 9 through 17, 2014; San Jose, US; (Joint Collaborative Team on Video Coding of ISO/IEC JTC1/SC29/WG11 and ITU-T SG.16); URL: http://wftp3.itu.int/av-arch/jctvc-site/, No. JCTVC-P0149, 7 pp.

Pang, Chao, et al., "SCCE1: Test 3.1—Block vector prediction method for Intra block copy", 18, JCT-VC Meeting; Jun. 30 through Jul. 9, 2014; Sapporo, JP; (Joint Collaborative Team on Video Coding (JCT-VC) of ITU-T SG 16 WP3 and ISO/IEC JTC 1/SC 29/WG 11); URL: http://wftp3.itu.int/av-arch/jctvc-site/, No. JCTVC-R0185, 8 pp.

Pang, Chao, "BoG report for block vector prediction methods for Intra block copy", 18, JCT-VC Meeting; Jun. 30 through Jul. 9, 2014; Sapporo, JP; (Joint Collaborative Team on Video Coding (JCT-VC) of ITU-T SG 16 WP 3 and ISO/IEC JTC 1/SC 29/WG 11); URL: http://wftp3.itu.int/av-arch/jctvc-site/, No. JCTVC-R0349, 6 pp.

Joshi, Rajan, et al., "High Efficiency Video Coding (HEVC) Screen Content Coding: Draft 2", 18, JCT-VC Meeting; Jun. 30 through Jul. 9, 2014; Sapporo, JP; (Joint Collaborative Team on Video Coding (JCT-VC) of ITU-T SG 16 WP3 and ISO/IEC JTC 1/SC 29/WG 11); URL: http://wftp3.itu.int/av-arch/jctvc-site/, No. JCTVC-S1005, 374 pp.

Wang, Ye-Kui, et al., "High Efficiency Video Coding (HEVC) Defect Report 2", 15, JCT-VC Meeting; Oct. 23 through Nov. 1, 2013; Geneva, CH; (Joint Collaborative Team on Video Coding (JCT-VC) of ITU-T SG 16 WP 3 and ISO/IEC JTV 1/SC 29/WG 11); URL: http://wftp3.itu.int/av-arch/jctvc-site/, No. JCTVC-O1003_v2, 311 pp.

Flynn, David, et al., "High Efficiency Video Coding (HEVC) Range Extensions text specification: Draft 6", 16, JCT-VC Meeting; Jan. 9 through 17, 2014; San Jose, US; (Joint Collaborative Team on Video Coding (JCT-VC) of ITU-T SG 16 WP 3 and ISO/IEC JTC 1/SC 29/WG 11); URL: http://wftp3.itu.int/av-arch/jctvc-site/, No. JCTVC-P1005_v4, 370 pp.

Yu et al., "Requirements for an extension of HEVC for coding of screen content," ISO/IEC JTC 1/SC 29/WG 11 Requirements subgroup, San Jose, California, USA, document MPEG2013/N14174, Jan. 2014. 5 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Bross et al., "WD4: Working Draft 4 of High-Efficiency Video Coding," 6th Meeting: JCTVC-F803_d2, Torino, IT, Oct. 4, 2011, 226 pp.

Bross et al., "WD5: Working Draft 5 of High-Efficiency Video Coding," 7th Meeting: Geneva, Switzerland, Dec. 30, 2011, JCTVC-G1103_d2, 214 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 9, 2012, JCTVC-J1003_d7, 261 pp.

Bross et al., "High efficiency video coding (HEVC) text specification draft 9," 11th Meeting: Shanghai, CN, Nov. 2, 2012, JCTVC-K1003_v7, 290 pp.

(56) References Cited

OTHER PUBLICATIONS

Bross et al., "High efficiency video coding (HEVC) text specification draft 10 (for FDIS & Last Call)," 12th Meeting: Geneva, CH, Mar. 19, 2013, JCTVC-L1003_v34, 310 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

ITU-T H-265, Series H: Audiovisual and Multimedia Systems, Infrastructure of audiovisual services—Coding of moving video, Advanced video coding for generic audiovisual services, The International Telecommunication Union. Apr. 2013, 317 pp.

ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

BLOCK VECTOR PREDICTOR FOR INTRA BLOCK COPYING

This application claims the benefit of U.S. Provisional Application No. 61/954,527, filed Mar. 17, 2014, U.S. Provisional Application No. 61/971,417, filed Mar. 27, 2014, and U.S. Provisional Application No. 62/000,445, filed May 19, 2014, the entire contents of each of which is incorporated by reference herein in its entirety.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized.

SUMMARY

In general, this disclosure describes techniques for performing Intra-prediction for video coding. More particularly, this disclosure describes techniques for facilitating Intra Block Copying (Intra BC). Intra BC refers to Intra-prediction techniques in which a current video block is coded based on a prediction block within the same picture. The prediction block within the same picture is identified by a vector, which may be referred to as a block vector. In some examples, the block vector may be represented by a plurality of syntax elements, which may be encoded and decoded. In some examples, the block vector for a current video block may be predicted based on one or more other block vectors for one or more previous video blocks.

As one example, a method for decoding video data using Intra BC includes: constructing a block vector candidate list for a current block of the video data, the block vector candidate list comprising a plurality of block vector predictor candidates, wherein each respective block vector predictor candidate of the plurality of block vector predictor candidates is one of: a block vector of a neighboring block, a block vector of a previously coded block, and a default block vector, wherein at least one block vector predictor candidate in the plurality of block vector predictor candidates is a default block vector, wherein the default block vector is a predefined block vector. In this example, the method also includes determining, based on a syntax element obtained from an encoded video bitstream, a particular block vector predictor candidate from the plurality of block vector predictor candidates, and determining, based on the particular block vector predictor candidate, a value of a block vector that represents a displacement between the current block of video data and a predictor block of video data in a picture in which the current block resides. In this example, the method also includes determining, based on the value the block vector, the predictor block of video data, and reconstructing the current block based on the predictor block.

As another example, a method for encoding video data using Intra BC includes constructing a block vector candidate list for a current block of the video data, the block vector candidate list comprising a plurality of block vector predictor candidates, wherein each respective block vector predictor candidate of the plurality of block vector predictor candidates is one of: a block vector of a neighboring block, a block vector of a previously coded block, and a default block vector, wherein at least one block vector predictor candidate in the plurality of block vector predictor candidates is a default block vector, wherein the default block vector is a predefined block vector. In this example, the method also includes selecting a particular block vector predictor candidate from the plurality of block vector predictor candidates, generating a syntax element that indicates the particular block vector predictor candidate, and including, in an encoded video bitstream, the syntax element.

As another example, a device for decoding video data includes a memory configured to store data associated with a current block of video data, and one or more processors. In this example, the one or more processors are configured to: construct a block vector candidate list for a current block of the video data, the block vector candidate list comprising a plurality of block vector predictor candidates, wherein each respective block vector predictor candidate of the plurality of block vector predictor candidates is one of: a block vector of a neighboring block, a block vector of a previously coded block, and a default block vector, wherein at least one block vector predictor candidate in the plurality of block vector predictor candidates is a default block vector, wherein the default block vector is a predefined block vector; determine, based on a syntax element obtained from an encoded video bitstream, a particular block vector predictor candidate from the plurality of block vector predictor candidates; determine, based on the particular block vector predictor candidate, a value of a block vector that represents a displacement between the current block of video data and a predictor block of video data in a picture in which the current block resides; determine, based on the value the block vector, the predictor block of video data; and reconstructing the current block based on the predictor block.

In another example, a device for encoding video data includes a memory configured to store data associated with a current block of video data, and one or more processors. In this example, the one or more processors are configured to: construct a block vector candidate list for a current block of the video data, the block vector candidate list comprising a plurality of block vector predictor candidates, wherein each respective block vector predictor candidate of the plurality of block vector predictor candidates is one of: a block vector of a neighboring block, a block vector of a previously coded block, and a default block vector, wherein at least one block vector predictor candidate in the plurality of block vector predictor candidates is a default block vector, wherein the default block vector is a predefined block vector; select a particular block vector predictor candidate from the plurality of block vector predictor candidates; generate a syntax element that indicates the particular block vector predictor candidate; and include, in an encoded video bitstream, the syntax element.

In another example, a device for decoding video data using Intra BC includes means for constructing a block vector candidate list for a current block of the video data, the block vector candidate list comprising a plurality of block vector predictor candidates, wherein each respective block vector predictor candidate of the plurality of block vector predictor candidates is one of: a block vector of a neighboring block, a block vector of a previously coded block, and a default block vector, wherein at least one block vector predictor candidate in the plurality of block vector predictor candidates is a default block vector, wherein the default block vector is a predefined block vector; means for determining, based on a syntax element obtained from an encoded video bitstream, a particular block vector predictor candidate from the plurality of block vector predictor candidates; means for determining, based on the particular block vector predictor candidate, a value of a block vector that represents a displacement between the current block of video data and a predictor block of video data in a picture in which the current block resides; means for determining, based on the value the block vector, the predictor block of video data; and means for reconstructing the current block based on the predictor block.

In another example, a device for encoding video data using Intra BC includes means for constructing a block vector candidate list for a current block of the video data, the block vector candidate list comprising a plurality of block vector predictor candidates, wherein each respective block vector predictor candidate of the plurality of block vector predictor candidates is one of: a block vector of a neighboring block, a block vector of a previously coded block, and a default block vector, wherein at least one block vector predictor candidate in the plurality of block vector predictor candidates is a default block vector, wherein the default block vector is a predefined block vector; means for selecting a particular block vector predictor candidate from the plurality of block vector predictor candidates; means for generating a syntax element that indicates the particular block vector predictor candidate; and means for including, in an encoded video bitstream, the syntax element.

In another example, a computer-readable storage medium stores instructions that, when executed, cause one or more processors of a device to decode video data using Intra BC by at least causing the one or more processors to: construct a block vector candidate list for a current block of the video data, the block vector candidate list comprising a plurality of block vector predictor candidates, wherein each respective block vector predictor candidate of the plurality of block vector predictor candidates is one of: a block vector of a neighboring block, a block vector of a previously coded block, and a default block vector, wherein at least one block vector predictor candidate in the plurality of block vector predictor candidates is a default block vector, wherein the default block vector is a predefined block vector; determine, based on a syntax element obtained from an encoded video bitstream, a particular block vector predictor candidate from the plurality of block vector predictor candidates; determine, based on the particular block vector predictor candidate, a value of a block vector that represents a displacement between the current block of video data and a predictor block of video data in a picture in which the current block resides; determine, based on the value the block vector, the predictor block of video data; and reconstruct the current block based on the predictor block.

In another example, a computer-readable storage medium stores instructions that, when executed, cause one or more processors of a device to encode video data using Intra Block Copy (BC) by at least causing the one or more processors to: construct a block vector candidate list for a current block of the video data, the block vector candidate list comprising a plurality of block vector predictor candidates, wherein each respective block vector predictor candidate of the plurality of block vector predictor candidates is one of: a block vector of a neighboring block, a block vector of a previously coded block, and a default block vector, wherein at least one block vector predictor candidate in the plurality of block vector predictor candidates is a default block vector, wherein the default block vector is a predefined block vector; select a particular block vector predictor candidate from the plurality of block vector predictor candidates; generate a syntax element that indicates the particular block vector predictor candidate; and include, in an encoded video bitstream, the syntax element.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
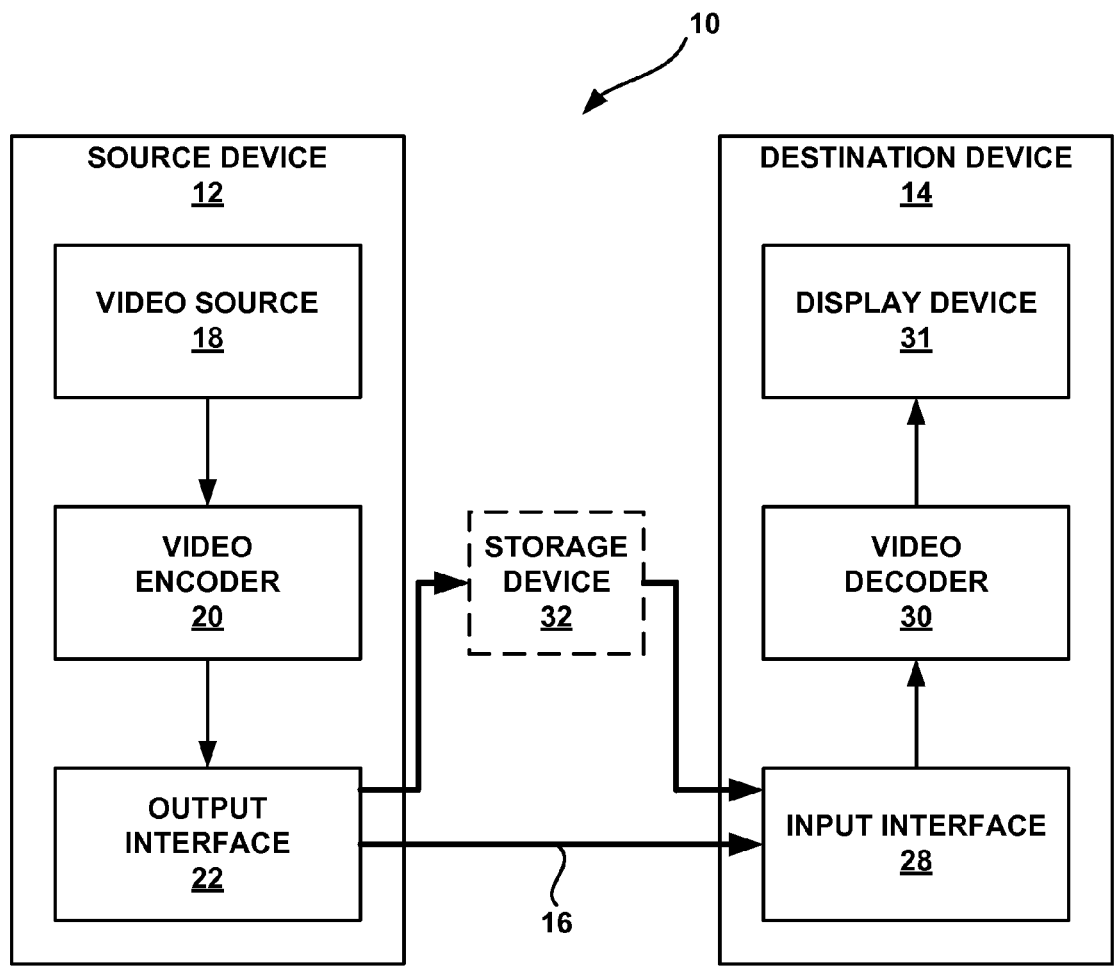
FIG. 1 is a block diagram illustrating an example video encoding and decoding system that may utilize one or more techniques described in this disclosure.

A video sequence is generally represented as a sequence of pictures. Typically, block-based coding techniques are used to code each of the individual pictures. That is, each picture is divided into blocks, and each of the blocks is individually coded. Coding a block of video data generally involves forming predicted values for samples (e.g., pixel values, such a luma samples and/or chroma samples) in the block and coding residual values. The predicted values are formed using samples in one or more predictive blocks. The residual values represent the differences between the pixels of the original block and the predicted sample values. Specifically, the original block of video data includes an array of sample values, and the predicted block includes an array of predicted pixel values. The residual values represent sample-by-sample differences between the sample values of the original block and the predicted sample values.

Prediction techniques for a block of video data are generally categorized as intra-prediction and inter-prediction. Intra-prediction, or spatial prediction, generally involves predicting the block from pixel values of neighboring, previously coded blocks in the same picture. Inter-prediction, or temporal prediction, generally involves predicting the block from pixel values of one or more previously coded pictures.

Many applications, such as remote desktop, remote gaming, wireless displays, automotive infotainment, cloud computing, etc., are becoming routine in daily lives. Video contents in these applications are usually combinations of natural content, text, artificial graphics, etc. In text and artificial graphics regions, repeated patterns (such as characters, icons, symbols, etc.) often exist. Intra Block Copying (BC) is a technique which may enable a video coder to remove such redundancy and improve intra-picture coding efficiency. In some instances, Intra BC alternatively may be referred to as Intra motion compensation (MC).

To predict a current block of video data using Intra BC techniques, a video coder may determine a block vector that identifies a predictive block of video data (i.e., a block of previously coded video data) that is within the same picture as the current block of video data. As one example, a video encoder may select the predictive block as a block of previously coded video data that is found to closely match the current block of video data, and generate a block vector that indicates a position of the predictive block relative to the current block. As another example, a video decoder may receive an indication of a block vector that indicates a position of a predictive block relative to a current block.

In accordance with one or more techniques of this disclosure, as opposed to simply encoding a value of the block vector without compression, a video encoder may implement a compression scheme to encode the value of the block vector as a difference between the block vector and a block vector predictor. In some examples, the block vector predictor may be the previously coded block vector (i.e., in a coding order). For instance, to encode the value of a block vector for a current block, a video encoder may determine a difference between the block vector and the previously coded block vector, and encode one or more syntax elements that indicate the difference between the block vector and the previously coded block vector.

To decode the value of the block vector for the current block, a video decoder may perform a complimentary process. For instance, the video decoder may receive the one or more syntax elements that indicate the difference between the block vector and the previously coded block vector, determine the value of the block vector for the current block based on the previously coded block vector and the one or more syntax elements. In this way, video coders may reduce the amount of data used to code a block vector.

However, in some examples, it may be desirable to utilize block vector predictors other than the previously coded block vector. As one example, for some blocks, it may be desirable to use a block vector of a neighboring block as a block vector predictor. For instance, the difference between a block vector of a current block and a block vector of a neighboring block may be less than the difference between the block vector and the current block and the previously coded block vector. As another example, for some blocks, it may not be possible to use either a previously coded block vector or a block vector of a neighboring block as a block vector predictor. For instance, there may not be a previously coded block vector or block vector of a neighboring block available for use as a block vector predictor for the first block in a coding tree unit (CTU) coded using Intra BC.

In accordance with one or more techniques of this disclosure, as opposed to always using the previously coded block vector as the block vector predictor when encoding a block of video data, a video encoder may utilize a plurality of block vector predictor candidates selected from a plurality of sources. For instance, the video encoder may construct a block vector candidate list which may include a plurality of block vector predictor candidates selected from block vectors of neighboring blocks, block vectors of previously decoded blocks, and default block vectors, select a particular block vector predictor candidate of the plurality of block vector predictor candidates, and encode a plurality of syntax elements that indicate which block vector predictor candidate of the plurality of block vector predictor candidates is selected and a difference between the block vector and the selected block vector predictor candidate.

To decode the value of the block vector for the current block, a video decoder may perform a complimentary process. For instance, the video decoder may obtain the plurality of syntax elements, construct a block vector candidate list that includes a plurality of block vector predictor candidates (i.e., using techniques similar to the video encoder), select a particular block vector predictor candidate of the plurality of block vector predictor candidates based on a syntax element of the plurality of syntax elements that indicates which block vector predictor candidate of the plurality of block vector predictor candidates was selected by the video encoder, and determine the value of the block vector for the current block based on the particular block vector predictor candidate and the one or more syntax elements that indicate the difference between the block vector and the selected block vector predictor candidate. In this way, video coders may further reduce the amount of data used to code a block vector.

In some examples, the block vector may have a plurality of components. For instance, the block vector may have a horizontal component (x) and a vertical component (y). As such, in some examples, the video encoder may encode the value of each respective component of the block vector by generating a respective plurality of syntax elements that collectively represent the value of the respective component of the block vector. In some examples, the video encoder may use the same block vector predictor candidate for each of the plurality of components. In some examples, the video encoder may different block vector predictor candidates for each of the plurality of components. A video decoder may implement a complementary scheme to decode the plurality of syntax elements into the respective values of the components of the block vector.

FIG. 1 is a block diagram illustrating an example video encoding and decoding system 10 that may utilize techniques for filtering video data. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

In some examples, encoded data may be output from source device 12 to storage device 32. Similarly, encoded data may be accessed from storage device 32 by input interface. Storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 32 may correspond to a file server or another intermediate storage device that may store the encoded video generated by source device 12.

Destination device 14 may access stored video data from storage device 32 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 32 may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 31. In accordance with this disclosure, video encoder 20 of source device 12 may be configured to apply the techniques for performing Intra Block Copy (BC) in video coding. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for performing Intra BC in video coding may be performed by any digital video encoding and/or decoding device. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 31 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined video encoder/decoder (codec). A device including video encoder 20 and/or video decoder 30 may comprise an integrated circuit, a microprocessor, and/or a wireless communication device, such as a cellular telephone.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

This disclosure may generally refer to video encoder 20 "signaling" certain information to another device, such as video decoder 30. It should be understood, however, that video encoder 20 may signal information by associating certain syntax elements with various encoded portions of video data. That is, video encoder 20 may "signal" data by storing certain syntax elements to headers of various encoded portions of video data. In some cases, such syntax elements may be encoded and stored (e.g., stored to storage device 32) prior to being received and decoded by video decoder 30. Thus, the term "signaling" may generally refer to the communication of syntax or other data for decoding compressed video data, whether such communication occurs in real- or near-real-time or over a span of time, such as might occur when storing syntax elements to a medium at the time of encoding, which then may be retrieved by a decoding device at any time after being stored to this medium.

Video encoder 20 and video decoder 30 may operate according to a video compression standard, such as the ITU-T H.264 standard, alternatively referred to as MPEG-4, Part 10, Advanced Video Coding (AVC), or extensions of such standards. The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. Other examples of video compression standards include MPEG-2 and ITU-T H.263.

While the techniques of this disclosure are not limited to any particular coding standard, the techniques may be relevant to the HEVC standard and particularly to HEVC range extensions such as screen content coding. The HEVC standardization efforts are based on a model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-five intra-prediction encoding modes.

In general, the working model of the HM describes that a video picture may be divided into a sequence of treeblocks, which are also referred to as "largest coding units" (LCUs) or coding tree units (CTUs), that may include both luma and chroma samples. Syntax data within a bitstream may define a size for the CTUs, which is a largest coding unit in terms of the number of pixels. A slice includes a number of consecutive CTUs. Each of the CTUs may comprise a coding tree block of luma samples, two corresponding coding tree blocks of chroma samples, and syntax structures used to code the samples of the coding tree blocks. In a monochrome picture or a picture that have three separate color planes, a CTU may comprise a single coding tree block and syntax structures used to code the samples of the coding tree block.

A video picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs. A CU may comprise a coding block of luma samples and two corresponding coding blocks of chroma samples of a picture that has a luma sample array, a Cb sample array and a Cr sample array, and syntax structures used to code the samples of the coding blocks. In a monochrome picture or a picture that have three separate color planes, a CU may comprise a single coding block and syntax structures used to code the samples of the coding block. A coding block is an N×N block of samples.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In some examples, four sub-CUs of a leaf-CU may also be referred to as leaf-CUs even if there is no explicit splitting of the original leaf-CU. For example, if a CU at 16×16 size is not split further, the four 8×8 sub-CUs may also be referred to as leaf-CUs although the 16×16 CU was never split.

A CU in the HEVC standard has a purpose similar to that of a macroblock of the H.264 standard. However, a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure may use the term "block" to refer to any of a CU, prediction unit (PU), or transform unit (TU), in the context of HEVC, or similar data structures in the context of other standards (e.g., macroblocks and sub-blocks thereof in H.264/AVC).

A CU includes a coding node, one or more PUs, and one or more TUs associated with the coding node. A size of the CU may correspond to a size of the coding node and must be square in shape. The size of the CU may range from 8×8 pixels up to the size of the treeblock with a maximum of 64×64 pixels or greater. Each CU may contain one or more PUs and one or more TUs.

In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. A prediction block may be a rectangular (i.e., square or non-square) block of samples on which the same prediction is applied. A PU of a CU may comprise a prediction block of luma samples, two corresponding prediction blocks of chroma samples of a picture, and syntax structures used to predict the prediction block samples. In a monochrome picture or a picture that have three separate color planes, a PU may comprise a single prediction block and syntax structures used to predict the prediction block samples.

A TU of a CU may comprise a transform block of luma samples, two corresponding transform blocks of chroma samples, and syntax structures used to transform the transform block samples. In a monochrome picture or a picture that has three separate color planes, a TU may comprise a single transform block and syntax structures used to transform the transform block samples. A transform block may be a rectangular block of samples on which the same transform is applied. A transform may be applied to each transform block of a TU to generate transform coefficients. Thus, TUs may include coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs.

Following transformation, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Video encoder 20 may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan.

After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

Video encoder 20 may further send syntax data, such as block-based syntax data, picture-based syntax data, and group of pictures (GOP)-based syntax data, to video decoder 30, e.g., in a picture header, a block header, a slice header, or a GOP header. The GOP syntax data may describe a number of pictures in the respective GOP, and the picture syntax data may indicate an encoding/prediction mode used to encode the corresponding picture.

Video decoder 30, upon obtaining the encoded video data, may perform a decoding pass generally reciprocal to the encoding pass described with respect to video encoder 20. For example, video decoder 30 may obtain an encoded video bitstream that represents video blocks of an encoded video slice and associated syntax elements from video encoder 20. Video decoder 30 may reconstruct the original, unencoded video sequence using the data contained in the bitstream.

Many applications, such as remote desktop, remote gaming, wireless displays, automotive infotainment, cloud computing, or the like, are becoming routine in daily personal lives. Video content in these applications are typically combinations of natural content, text, artificial graphics, and the like. In text and artificial graphics, region of the content may include repeated patterns (such as characters, icons, and symbols to provide a few examples) often exist. Intra block copying (BC) is a technique that enables removal of this kind of redundancy, thereby potentially improving the intra-picture coding efficiency, e.g., as described in Pang et al., "Non-RCE3: Intra Motion Compensation with 2-D MVs,"

Document: JCTVC-NO256, JCT-VC of ITU-T SG 16 WP 3 and ISO/IEC JTC 1/SC 29/WG 11, 14$^{th}$ Meeting: Vienna, AT 25 Jul.-2 Aug. 2013 (hereinafter "JCTVC-N0256"). At a recent JCT-VC meeting, an Intra BC process was adopted in the HEVC Range Extension standard (which has since been moved to the Screen Contents Coding extension of HEVC).

Figure 5:
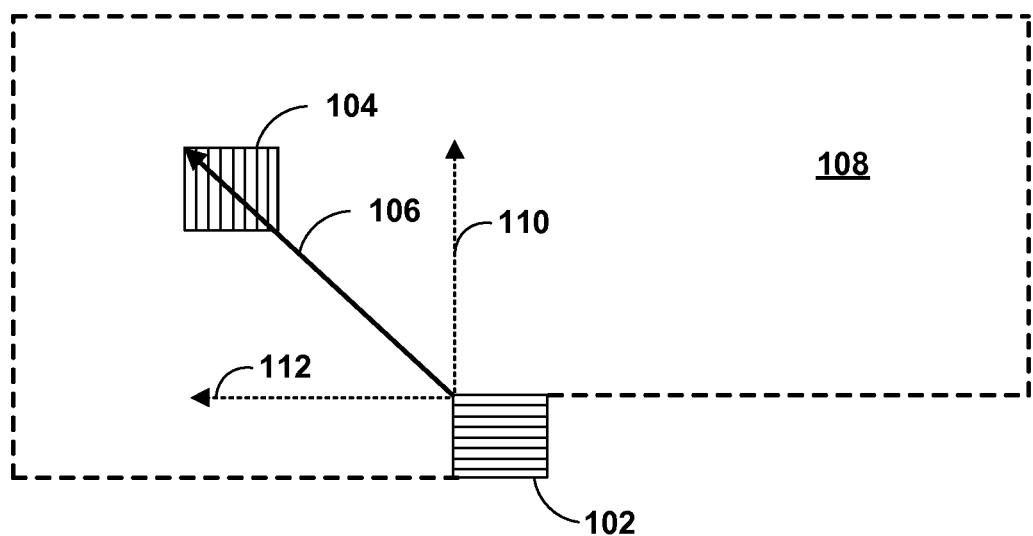
FIG. 5 illustrates an example of an intra-prediction process including Intra BC, in accordance with one or more techniques of the present disclosure.

As illustrated in more detail in the example of FIG. 5, for a current coding unit (CU) (e.g., current video block 102 of FIG. 5) coded using Intra BC, video encoder 20 may obtain a prediction signal (e.g., prediction block 104 of FIG. 5) (which may also be referred to as a "prediction block") from a search region (e.g., search region 108 of FIG. 5) in the same picture. In some instances, video encoder 20 may encode a vector, e.g., block vector 106 of FIG. 5, which indicates the position of the prediction block displaced from the current CU. In some examples, the block vector may indicate the position of the top-left corner of the prediction block relative to the position of the top-left corner of the current CU. The block vector, in some instances, also may be referred to as an offset vector, displacement vector, or motion vector. Video encoder 20 also may encode residual data indicating differences between the pixel values of the current video block and the predictive samples in the predictive block.

In a previous HEVC Range Extension standard draft, as described in Flynn et al., "High Efficiency Video Coding (HEVC) Range Extensions text specification: Draft 6," Document: JCTVC-P1005_v1, JCT-VC of ITU-T SG 16 WP 3 and ISO/IEC JTC 1/SC 29/WG 11, 16$^{th}$ Meeting: San José, US 9-17 Jan. 2014 (hereinafter "JCTVC-P1005"), the vector for Intra BC (e.g., block vector 106 of FIG. 5) was encoded using the motion vector difference (MVD) coding method in HEVC. Specifically, as described in JCTVC-P1005, the vector for Intra BC was encoded using a first syntax element that specifies whether the absolute value of the vector component is greater than zero (i.e., abs_mvd_greater0_flag), a second syntax element that specifies whether the absolute value of the vector is greater than one (i.e., abs_mvd_greater1_flag), a third syntax element that specifies the absolute value of the vector minus two (i.e., abs_mvd_minus2), and a fourth syntax element that specifies the sign of the vector (i.e., mvd_sign_flag). However, due to the different characteristics of Intra BC block vector field from conventional inter motion vector field, this coding method may not be efficient. For instance, as a histogram of values for Intra BC block vectors is typically flatter than a histogram of values for conventional inter motion vectors, it may not be efficient to code values of Intra BC block vectors using the same techniques used to code values of conventional inter motion vectors.

In accordance with one or more aspects of the techniques described in this disclosure, as opposed to encoding a value of a block vector using the motion vector difference (MVD) coding method in HEVC, video encoder 20 may encode the value of a block vector using an encoding method tailored to the characteristics of block vectors. For example, as opposed to encoding a value of a block vector by signaling four syntax elements, video encoder 20 may encode the value of a block vector by signaling three syntax elements. In this way, techniques of this disclosure may reduce the number of syntax elements used to encode the value of a block vector, which may improve coding efficiency.

For instance, video encoder 20 may encode a value of a block vector by encoding a first syntax element that indicates whether or not an absolute value of the block vector is non-zero, a second syntax element that represents the absolute value of the block vector minus an offset, and a third syntax element that indicates a sign of the value of the block vector. In some examples, such as where each of the syntax elements are composed of one or more binary values, the syntax elements may be referred to as bin values (e.g., the first syntax element may be a first bin value, the second syntax element may be a set of bin values, and the third syntax element may be a sign bin value).

In some examples, the block vector may have a single component. For instance, video encoder 20 may be configured to use blocks of previously coded video data that are either directly above or directly in line horizontally with the current block of video data in the same picture for prediction of the current video block. In other words, if a picture of video data is imposed on a 2-D grid, each block of video data would occupy a unique range of x-values and y-values. Accordingly, video encoder 20 may predict a current block of video data based on blocks of previously coded video data that share only the same set of x-values (i.e., vertically in-line with the current video block) or the same set of y-values (i.e., horizontally in-line with the current video block).

In examples where video encoder 20 is configured to predict a current block of video data based on blocks of previously encoded video data that share only the same set of x-values, video encoder 20 may encode a block vector with a single component that identifies a prediction block of the blocks of previously encoded video data that share only the same set of x-values. Similarly, in examples where video encoder 20 is configured to predict a current block of video data based on blocks of previously coded video data that share only the same set of y-values, video encoder 20 may encode a block vector with a single component that identifies a prediction block of the blocks of previously encoded video data that share only the same set of y-values.

In some examples, the block vector may have multiple components. For instance, as described JCTVC-N0256, video encoder 20 may determine and encode a two-dimensional block vector which identifies a prediction block within the same picture as the current video block. In any case, the two-dimensional block vector may have a horizontal (x) displacement component (e.g., horizontal displacement component 112 of block vector 106 of FIG. 5) and a vertical (y) displacement component (e.g., vertical displacement component 110 of block vector 106 of FIG. 5), each of which may be zero or non-zero. The horizontal displacement component represents a horizontal displacement between the predictive block of video data, or prediction block, and a current block of video data and the vertical displacement component represents a vertical displacement between the prediction block of video data and the current block of video data. In accordance with one or more techniques of this disclosure, video encoder 20 may encode a respective plurality of syntax elements that each collectively represent the respective value of each component of the block vector. That is, one set of syntax elements may represent the horizontal displacement component of the block vector, and another set of syntax elements may represent the vertical displacement component of the block vector. For each component, the set of syntax elements may include a first syntax element that indicates whether or not an absolute value of the respective component of the block vector is non-zero, a second syntax element that represents the absolute value of the respective component of the block vector minus an offset, and a third syntax element that indicates a sign of the value of the respective component of the block vector.

In some examples, as opposed to encoding syntax elements to represent the value of a block vector, video encoder 20 may encode syntax elements to represent a difference between the value of the block vector and a block vector predictor. In some examples, the block vector predictor may be the previously coded block vector (i.e., in a coding order). For instance, to encode the value of a block vector for a current block, video encoder 20 may determine a difference between the block vector and the previously coded block vector, and encode one or more syntax elements that indicate the difference between the block vector and the previously coded block vector. In this way, video encoder 20 may reduce the amount of data used to encode a block vector.

However, in some examples, it may be desirable to utilize block vector predictors other than the previously coded block vector. As one example, in some situations, it may be desirable to use a block vector of a neighboring block as a block vector predictor. For instance, the difference between a block vector of a current block and a block vector of a neighboring block may be less than the difference between the block vector and the current block and the previously coded block vector. As another example, for some blocks, it may not be possible to use either a previously coded block vector or a block vector of a neighboring block as a block vector predictor. For instance, there may not be a previously coded block vector or block vector of a neighboring block available for use as a block vector predictor for the first block in a coding tree unit (CTU) coded using Intra BC.

In accordance with one or more techniques of this disclosure, as opposed to always using the previously coded block vector as the block vector predictor when encoding a block of video data, video encoder 20 may utilize a plurality of block vector predictor candidates. For instance, video encoder 20 may construct a block vector candidate list that includes a plurality of block vector predictor candidates, select a particular block vector predictor candidate of the plurality of block vector predictor candidates, and encode a plurality of syntax elements that indicate which block vector predictor candidate of the plurality of block vector predictor candidates is selected and a difference between the block vector and the selected block vector predictor candidate. In this way, video encoder 20 may further reduce the amount of data used to encode a block vector.

Video encoder 20 may encode the current block using the prediction block identified by the block vector. For instance, video encoder 20 may determine a residual block that represents pixel differences between the prediction block and the current block, and encode the determined residual block along with the encoded block vector that identifies the prediction block.

Video decoder 30 also may be configured to use techniques that are generally reciprocal to those described above with respect to video encoder 20. In this respect, video decoder 30 may be configured to perform an Intra BC process to decode a coded current block of a picture using a prediction block identified by a block vector.

In accordance with one or more aspects of the techniques described in this disclosure, as opposed to decoding a value of a block vector using the motion vector difference (MVD) coding method in HEVC, video decoder 30 may decode the value of a block vector using a decoding method tailored to the characteristics of block vectors. For example, as opposed to decoding a value of a block vector based on four syntax elements (including a fourth syntax element that indicates the value of the block vector (or component thereof) is greater than one), video decoder 30 may decode the value of a block vector based on three syntax elements, without decoding a fourth syntax element that indicates whether the value of the block vector (or component thereof) is greater than one.

For instance, video decoder 30 may decode the value of the block vector by decoding a first syntax element that indicates whether or not an absolute value of block vector is non-zero, a second element that represents the absolute value of the block vector minus an offset, and a third syntax element that indicates a sign of the value of the block vector. In this way, video decoder 30 may decode the value of a block vector by decoding a plurality of syntax elements that collectively represent the value of the block vector.

As discussed above, in some examples, the block vector may have a horizontal component and a vertical component. As such, in some examples, video decoder 30 may decode a value of a horizontal component of the block vector by decoding a first plurality of syntax elements and decode a value of a vertical component of the block vector by decoding a second plurality of syntax elements. In some examples, the first plurality of syntax elements may include a first syntax element that indicates whether or not an absolute value of the horizontal component of the block vector is non-zero, a second element that represents the horizontal component of the absolute value of the block vector minus an offset, and a third syntax element that indicates a sign of the value of the horizontal component of the block vector. In some examples, the second plurality of syntax elements may include a first syntax element that indicates whether or not an absolute value of the vertical component of the block vector is non-zero, a second element that represents the vertical component of the absolute value of the block vector minus an offset, and a third syntax element that indicates a sign of the value of the vertical component of the block vector.

In some examples, as opposed to decoding syntax elements to represent the value of a block vector, video decoder 30 may decode syntax elements to represent a difference between the value of the block vector and a block vector predictor. In some examples, the block vector predictor may be the previously coded block vector (i.e., in a coding order). For instance, to decode the value of a block vector for a current block, video decoder 30 may decode one or more syntax elements that indicate a difference between the block vector and the previously coded block vector, and determine the block vector based on the difference and the previously coded block vector.

In accordance with one or more techniques of this disclosure, as opposed to always using the previously coded block vector as the block vector predictor when encoding a block of video data, video decoder 30 may utilize a plurality of block vector predictor candidates. For instance, video decoder 30 may obtain the plurality of syntax elements, construct a block vector candidate list that includes a plurality of block vector predictor candidates (i.e., using techniques similar to video encoder 20), determine a particular block vector predictor candidate of the plurality of block vector predictor candidates based on a syntax element of the plurality of syntax elements that indicates which block vector predictor candidate of the plurality of block vector predictor candidates was selected by video encoder 20, and determine the value of the block vector for the current block based on the particular block vector predictor candidate and the one or more syntax elements that indicate the difference between the block vector and the selected block vector predictor candidate. In this way, video decoder may further reduce the amount of data used to code a block vector.

Video decoder 30 may decode the current block using the predictor block identified by the block vector. For instance, video decoder 30 may generate the current block based on a residual block that represents pixel differences between the prediction block and the current block.

Figure 2:
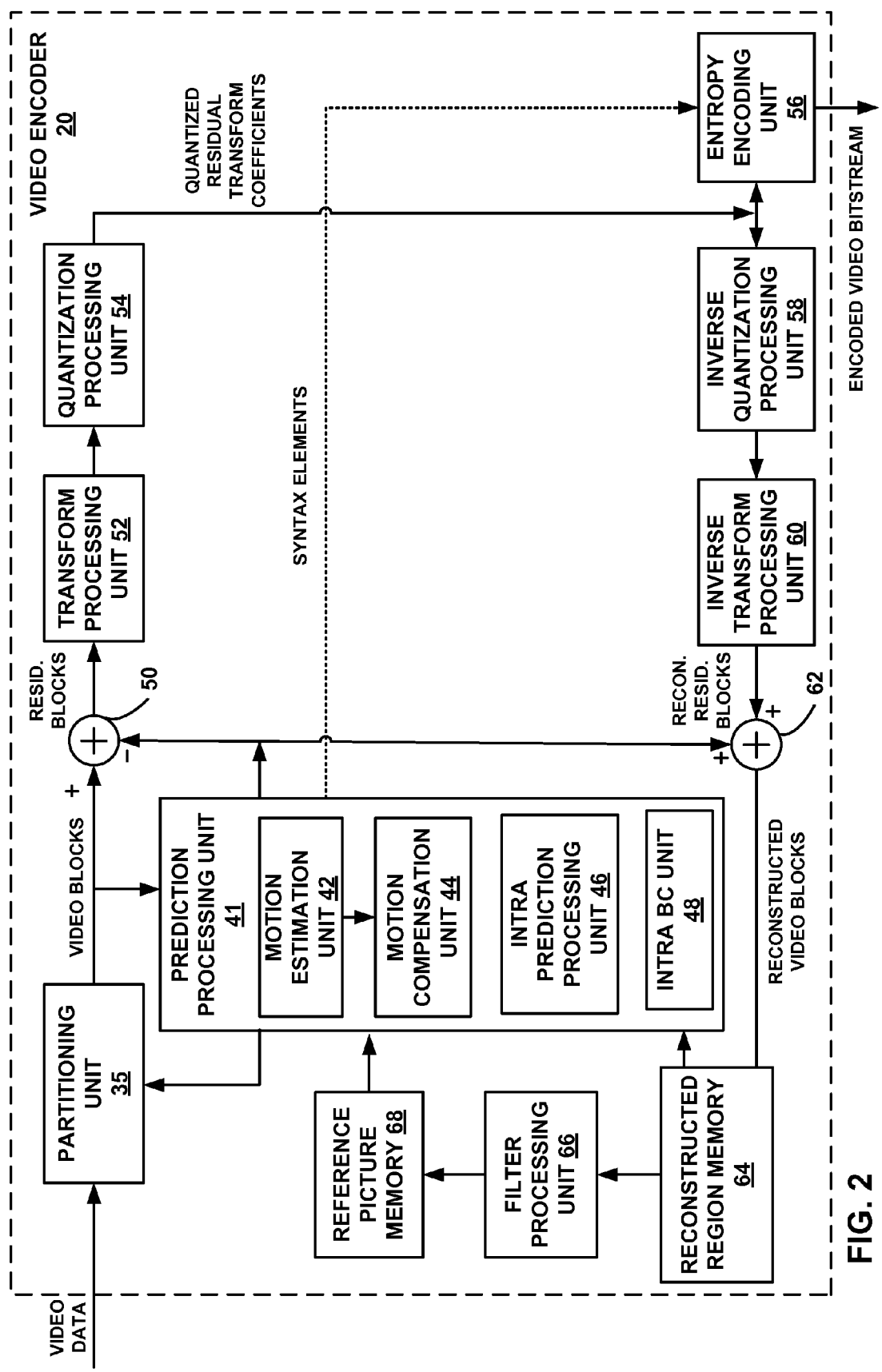
FIG. 2 is a block diagram illustrating an example video encoder that may implement one or more techniques described in this disclosure.

FIG. 2 is a block diagram illustrating an example video encoder that may implement the techniques described in this disclosure. Video encoder 20 may perform intra- and inter-coding of video blocks within video slices. Intra coding relies on spatial prediction to reduce or remove spatial redundancy in video within a given video frame or picture. Inter-coding relies on temporal or inter-view prediction to reduce or remove redundancy in video within adjacent frames or pictures of a video sequence. Intra-mode (I mode) may refer to any of several spatial based compression modes. Inter-modes, such as uni-directional prediction (P mode) or bi-prediction (B mode), may include to any of several temporal-based compression modes. Video encoder 20 may also be configured to utilize a mode for intra prediction of blocks of video data from predictive blocks of video data within the same picture, e.g., an Intra BC mode, as described herein.

In the example of FIG. 2, video encoder 20 includes a partitioning unit 35, prediction processing unit 41, reconstructed region memory 64, filter processing unit 66, reference picture memory 68, residual generation unit 50, transform processing unit 52, quantization processing unit 54, and entropy encoding unit 56. Prediction processing unit 41 includes motion estimation unit 42, motion compensation unit 44, intra prediction processing unit 46, and Intra Block Copy (Intra BC) unit 48. For video block reconstruction, video encoder 20 also includes inverse quantization processing unit 58, inverse transform processing unit 60, and summer 62.

In various examples, a unit of video encoder 20 may be tasked to perform the techniques of this disclosure. Also, in some examples, the techniques of this disclosure may be divided among one or more of the units of video encoder 20. For example, Intra BC unit 48 may perform the techniques of this disclosure, alone, or in combination with other units of video encoder, such as motion estimation unit 42, motion compensation unit 44, intra prediction processing unit 46, reconstructed region memory 64, and entropy encoding unit 56.

As shown in FIG. 2, video encoder 20 receives video data, and partitioning unit 35 partitions the video data into video blocks. This partitioning may also include partitioning into slices, tiles, or other larger units, as well as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles).

Prediction processing unit 41 may select one of a plurality of possible coding modes, such as one of a plurality of intra coding modes, one of a plurality of inter coding modes, or an Intra BC mode according to the techniques described in this disclosure, for a current video block based on rate-distortion results (e.g., coding bit rate and the level of distortion). Prediction processing unit 41 may provide the resulting predictive block to residual generation unit 50 to generate residual block data and to summer 62 to reconstruct the current block for use in prediction of other video blocks, e.g., as a reference picture.

Intra prediction processing unit 46 within prediction processing unit 41 may perform intra-predictive coding of the current video block relative to one or more neighboring blocks in the same picture or slice as the current block to be coded to provide spatial compression. Motion estimation unit 42 and motion compensation unit 44 within prediction processing unit 41 perform inter-predictive coding of the current video block relative to one or more predictive blocks in one or more reference pictures, e.g., to provide temporal compression.

Motion estimation unit 42 may be configured to determine the inter-prediction mode for a video slice according to a predetermined pattern for a video sequence. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video picture relative to a predictive block within a reference picture. Similarly, the block vector used for Intra BC according to the techniques of this disclosure indicate the displacement of a PU of a video block within a current video frame or picture relative to a predictive block within the same frame or picture. Intra BC unit 48 may determine vectors, e.g., block vectors, for Intra BC coding in a manner similar to the determination of motion vectors by motion estimation unit 42 for inter prediction, or may utilize motion estimation unit 42 to determine the block vector.

A predictive block, e.g., identified by motion estimation unit 42 and/or Intra BC unit 48 for inter prediction or Intra BC prediction, is a block that includes samples that are found to closely match samples in a prediction block of a PU of the video block to be coded in terms of pixel difference. In some examples, motion estimation unit 42 and/or Intra BC unit 48 may determine the pixel difference based on a sum of absolute difference (SAD), a sum of squared difference (SSD), and/or other difference metrics. In some examples, video encoder 20 may calculate values for sub-integer pixel positions of reference pictures stored in reference picture memory 68 or the reconstructed region of the current picture stored in reconstructed region memory 64. For example, video encoder 20 may interpolate values of one-quarter pixel positions, one-eighth pixel positions, or other fractional pixel positions of the reference picture. Therefore, motion estimation unit 42 and/or Intra BC unit 48 may perform a search for a predictive block relative to the full pixel positions and fractional pixel positions and output a vector with fractional pixel precision.

Motion estimation unit 42 may calculate a motion vector for a PU of a video block in an inter-coded slice by comparing the position of the PU to the position of a predictive block of a reference picture. The reference picture may be selected from a first reference picture list (List 0 or RefPicList0) or a second reference picture list (List 1 or RefPicList1), each of which identify one or more reference pictures stored in reference picture memory 68. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of a video block, motion compensation unit 44 may locate the predictive block to which the motion vector points in one of the reference picture lists.

In some examples, Intra BC unit 48 may generate vectors and fetch predictive blocks in a manner similar to that described above with respect to motion estimation unit 42 and motion compensation unit 44, but with the predictive blocks being in the same picture or frame as the current block and with the vectors being referred to as block vectors as opposed to motion vectors. In other examples, Intra BC unit 48 may use motion estimation unit 42 and motion compensation unit 44, in whole or in part, to perform such functions for Intra BC prediction according to the techniques described herein. In either case, for Intra BC, a predictive block may be a block that is found to closely match the block to be coded, in terms of pixel difference, which may be determined by sum of absolute difference (SAD), sum of squared difference (SSD), or other difference metrics, and identification of the block may include calculation of values for sub-integer pixel positions.

Whether the predictive block is from the same picture according to Intra BC prediction, or a different picture according to inter prediction, video encoder 20 may form a residual video block by subtracting sample values (e.g., pixel values) of the predictive block from the sample values of the current video block being coded, forming sample difference values. The sample difference values form residual data for the block, and may include both luma component differences and chroma component differences. Residual generation unit 50 represents the component or components that perform this subtraction operation. In some examples, as opposed to directly performing subtraction to form the sample difference values, residual generation unit 50 may perform operations to emulate a subtraction operation (i.e., such that the result is the same as subtraction but without the computational complexities of subtraction). In this way, residual generation unit 50 may reduce the computational complexity of Intra BC coding.

Intra BC unit 48 and/or motion compensation unit 44 may also generate syntax elements associated with the video blocks and the video slice for use by a video decoder, such as video decoder 30, in decoding the video blocks of the video slice. The syntax elements may include, for example, syntax elements defining the vector used to identify the predictive block, any flags indicating the prediction mode, or any other syntax described with respect to the techniques of this disclosure.

Intra-prediction processing unit 46 may intra-predict a current block, as an alternative to the inter-prediction performed by motion estimation unit 42 and motion compensation unit 44, or the Intra BC prediction performed by Intra BC unit 48, as described above. In particular, intra-prediction processing unit 46 may determine an intra-prediction mode to use to encode a current block. In some examples, intra-prediction processing unit 46 may encode a current video block using various intra-prediction modes, e.g., during separate encoding passes, and intra-prediction processing unit 46 (or prediction processing unit 41, in some examples) may select an appropriate intra-prediction mode to use from the tested modes. For example, intra-prediction processing unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode in accordance with the techniques of this disclosure. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

After prediction processing unit 41 generates the predictive block for the current video block via inter-prediction, intra-prediction, or Intra BC prediction, video encoder 20 forms a residual video block by subtracting the predictive block from the current video block, e.g., via residual generation unit 50. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization processing unit 54. Quantization processing unit 54 quantizes the transform coefficients to further reduce bit rate. The quantization process may reduce the bit depth associated with some or all of the coefficients. The degree of quantization may be modified by adjusting a quantization parameter. In some examples, quantization processing unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Entropy encoding unit 56 may perform any of the techniques described herein for binarization and encoding syntax elements, including vector components, flags, and other syntax elements, for the prediction according to the Intra BC mode. Following the entropy encoding by entropy encoding unit 56, the encoded video bitstream may be transmitted to video decoder 30, or archived for later transmission or retrieval by video decoder 30.

Inverse quantization processing unit 58 and inverse transform processing unit 60 apply inverse quantization and inverse transformation, respectively, to reconstruct the residual block in the pixel domain for later use as a reference block for prediction of other video blocks. Motion compensation unit 44 and/or Intra BC unit 48 may calculate a reference block by adding the residual block to a predictive block of one of the reference pictures within one of the reference picture lists. Motion compensation unit 44 and/or Intra BC unit 48 may also apply one or more interpolation filters to the reconstructed residual block to calculate sub-integer pixel values for use in motion estimation.

Summer 62 adds the reconstructed residual block to the motion compensated prediction block produced by motion compensation unit 44 and/or Intra BC unit 48 to produce a reconstructed video block. Reconstructed region memory 64 stores reconstructed video blocks according to the definition of the reconstructed region for Intra BC of a current video block by video encoder 20, e.g., Intra BC unit 48, as described herein. Reconstructed region memory 64 may store reconstructed video blocks that have not been in-loop filtered by filter processing unit 66. Summer 62 may provide the reconstructed video blocks to filter processing unit 66 in parallel with reconstructed region memory 64, or reconstructed region memory 64 may release the reconstructed video blocks to filter processing unit 66 when no longer needed for the reconstructed region for Intra BC. In either case, Intra BC unit 48 may search the reconstructed video blocks in reconstructed region memory 64 for a predictive video block within the same picture as the current video block to predict the current video block.

Filter processing unit 66 may perform in-loop filtering on the reconstructed video blocks. In-loop filtering may include deblock filtering to filter block boundaries to remove blockiness artifacts from reconstructed video. In-loop filtering may also include SAO filtering to improve the reconstructed video. Reconstructed blocks, some of which may be in-loop filtered, may be stored in reference picture memory 68 as reference pictures. The reference pictures may include reconstructed blocks that may be used by motion estimation unit 42 and motion compensation unit 44 as a predictive block to inter-predict a block in a subsequent video frame or picture.

In accordance with one or more aspects of the techniques described in this disclosure, as opposed to encoding a value of a block vector using the motion vector difference (MVD) coding method in HEVC, entropy encoding unit 56 may encode the value of a block vector using an encoding method tailored to the characteristics of block vectors. In this way, techniques of this disclosure may reduce the number of syntax elements used to encode the value of a block vector, which may improve coding efficiency.

The block vector may be a two-dimensional block vector that includes a horizontal component and a vertical component or the block vector may be a one-dimensional block vector that includes a horizontal component or a vertical component. The horizontal component may represent a horizontal displacement between the predictive block of video data and the current block of video data. The vertical component may represent a vertical displacement between the predictive block of video data and the current block of video data. The predictive block of video data may be within the same frame as the current block of video data. Intra BC unit 48 may output a plurality of syntax elements for one or both of the horizontal component and the vertical component. In some examples, intra-prediction processing unit 46 may output the plurality of syntax elements for a particular component of a block vector by outputting a first syntax element and a second syntax element. As discussed above, in some examples, such as where each of the syntax elements is composed of one or more binary values, the syntax elements may be referred to as bin values (e.g., the first syntax element may be a first bin value "b0", the second syntax element may be a set of bin values "b1b2 . . . ").

Entropy encoding unit 56 may determine the first syntax element for the component of the block vector. In some examples, the first syntax element may indicate that an absolute value of a block vector component is non-zero. Entropy encoding unit 56 may determine the absolute value of a block vector component. Entropy encoding unit 56 may analyze the absolute value of the component to determine if it is greater than zero (i.e., if the component is non-zero). Where the absolute value of the component is greater than zero, entropy encoding unit 56 may determine that the first syntax element is one. Where the absolute value of the component is not greater than zero, entropy encoding unit 56 may determine that the first syntax element is zero.

In some examples, entropy encoding unit 56 may encode the first syntax element using context-adaptive binary arithmetic coding (CABAC) with a context. In some of such examples entropy encoding unit 56 may encode both a first syntax element for the horizontal component and a first syntax element for the vertical component with separate contexts. In other of such examples, entropy encoding unit 56 may encode both the first syntax element for the horizontal component and the first syntax element for the vertical component with the same context.

Entropy encoding unit 56 may determine a second syntax element for the component of the block vector. In some examples, the second syntax element may represent a function of the absolute value of the component. For instance, the second syntax element may represent the absolute value of the component minus an offset. In some examples, the offset may be one. Entropy encoding unit 56 may determine the second syntax element by subtracting the offset from the absolute value of the component.

Entropy encoding unit 56 may encode the second syntax element using, e.g., unary codes, exponential Golomb codes, or Rice-Golomb codes. In some examples, the order of the exponential Golomb codes, or the order of the Rice-Golomb codes used by entropy encoding unit 56 may be based on a size of the CU associated with the current video block. In some examples, entropy encoding unit 56 may encode the second syntax element using exponential Golomb codes with parameter three in bypass mode.

In some examples, in addition to the first syntax element and the second syntax element, the plurality of syntax elements encoded by entropy encoding unit 56 to represent the component may include a third syntax element that indicates a sign of the component. In other words, the third syntax element may indicate whether the component is positive or negative. Similar to the first syntax element and the second syntax element, in some examples, such as where the third syntax element is a binary value, the third syntax element may be referred to as a sign bin value.

In some examples, entropy encoding unit 56 may encode the third syntax element using unary codes, exponential Golomb codes, or Rice-Golomb codes. In some examples, entropy encoding unit 56 may encode the third syntax using CABAC with one or more contexts. In some of such examples, entropy encoding unit 56 may encode both the horizontal component and the vertical component, and the third syntax element for the horizontal component and the third syntax element for the vertical component may be encoded with separate contexts. In some of such examples, entropy encoding unit 56 may encode both the horizontal component and the vertical component, and the third syntax element for the horizontal component and the third syntax element for the vertical component may be encoded with corresponding contexts (e.g., the same contexts).

In some examples, the plurality of syntax elements encoded by entropy encoding unit 56 to represent the component may include a fourth syntax element that indicates whether or not the absolute value of the component is one. However, as opposed to the syntax element used in HEVC to specify whether the absolute value of a motion vector is greater than one (i.e., the abs_mvd_greater1_flag), the fourth syntax element described herein indicates whether or not the absolute value of the component is one. In such examples, the offset used by entropy encoding unit 56 to encode the second syntax element representing the absolute value of the vector magnitude may be two. Similar to the other syntax elements of the plurality of syntax elements, in some examples, such as where the fourth syntax element is a binary value, the fourth syntax element may be referred to as a fourth bin value.

In some examples, entropy encoding unit 56 may encode the fourth syntax using CABAC with a context. In some of such examples, entropy encoding unit 56 may encode both a fourth syntax element for the horizontal component and a fourth syntax element for the vertical component with separate contexts. In each case, this fourth syntax element indicates whether the value of the respective component is equal to one. In other of such examples, entropy encoding unit 56 may encode both the fourth syntax element for the horizontal component and the fourth syntax element for the vertical component with the same context.

In some examples, as opposed to indicating that the absolute value of a block vector component is non-zero, entropy encoding unit 56 may encode the first syntax element to indicate that the second syntax element represents a function of the component.

As one example, entropy encoding unit 56 may encode the first syntax element to indicate that the second syntax element represents a value of the component minus an offset. For instance, entropy encoding unit 56 may determine the second syntax element by subtracting the offset from the component. In some examples, such as where the second syntax element represents the value of the component minus the offset, entropy encoding unit 56 may encode the first syntax element as one. In some examples, such as where the second syntax element does not represent the value of the component minus the offset, entropy encoding unit 56 may encode the first syntax element as zero.

As another example, entropy encoding unit 56 may encode the first syntax element to indicate that the second syntax element represents the absolute value of the component minus an offset. For instance, entropy encoding unit 56 may determine the second syntax element by subtracting the offset from the absolute value of the component. In some examples, such as where the second syntax element represents the absolute value of the component minus the offset, entropy encoding unit 56 may encode the first syntax element as one. In some examples, such as where the second syntax element does not represent the absolute value of the component minus the offset, entropy encoding unit 56 may encode the first syntax element as zero.

In some examples, entropy encoding unit 56 may encode both the horizontal component and the vertical component, and the horizontal component and the vertical component may share the same first syntax element. In some examples, entropy encoding unit 56 may encode both the horizontal component and the vertical component, and the horizontal component and the vertical component may not share the same first syntax element. Rather, the horizontal and vertical components may have separate first syntax elements.

In some examples, the offset used by entropy encoding unit 56 may correspond to a predetermined value. As one example, where the plurality of syntax elements includes the first syntax element and the second syntax element, but not the fourth syntax element, the offset may be one. As another example, where the plurality of syntax elements includes the first syntax element, the second syntax element, and the fourth syntax element, the offset may be two. In some examples, the offset used by entropy encoding unit 56 may be based on one or more properties of the video data. For instance, the offset may correspond to a width of the CU multiplied by negative one. In some examples, entropy encoding unit 56 may encode both the horizontal component and the vertical component, and the offset for the horizontal component may be the same as the offset for the vertical component. In some examples, entropy encoding unit 56 may encode both the horizontal component and the vertical component, and the offset for the horizontal component may not be the same as the offset for the vertical component.

In some examples, as opposed to encoding syntax elements to represent the value of a block vector, entropy encoding unit 56 may encode syntax elements to represent a difference between the value of the block vector and a block vector predictor. In some examples, the block vector predictor may be the previously coded block vector (i.e., in a coding order). For instance, to encode the value of a block vector for a current block, Intra BC unit 48 may determine a difference between the block vector and the previously coded block vector, and cause entropy encoding unit 56 to encode one or more syntax elements that indicate the difference between the block vector and the previously coded block vector. In this way, Intra BC unit 48 may reduce the amount of data used to encode a block vector.

However, in some examples, it may be desirable to utilize block vector predictors other than the previously coded block vector. As one example, in some situations, it may be desirable to use a block vector of a neighboring block as a block vector predictor. For instance, the difference between a block vector of a current block and a block vector of a neighboring block may be less than the difference between the block vector and the current block and the previously coded block vector. As another example, for some blocks, it may not be possible to use either a previously coded block vector or a block vector of a neighboring block as a block vector predictor. For instance, there may not be a previously coded block vector or block vector of a neighboring block available for use as a block vector predictor for the first block in a coding tree unit (CTU) coded using Intra BC.

In accordance with one or more techniques of this disclosure, as opposed to always using the previously coded block vector as the block vector predictor when encoding a block of video data, Intra BC unit 48 may utilize a plurality of block vector predictor candidates. For instance, Intra BC unit 48 may construct a block vector candidate list that includes a plurality of block vector predictor candidates, select a particular block vector predictor candidate of the plurality of block vector predictor candidates, and cause entropy encoding unit 56 to encode a plurality of syntax elements that indicate which block vector predictor candidate of the plurality of block vector predictor candidates is selected and a difference between the block vector and the selected block vector predictor candidate.

In some examples, Intra BC unit 48 may select the plurality of block vector candidates from a plurality of different groups. For instance, Intra BC unit 48 may select block vector predictor candidates from block vectors of neighboring blocks, block vectors of previously coded blocks, and default block vectors. In some examples, Intra BC unit 48 may evaluate block vector predictor candidates from the different groups in a particular order until the block vector candidate list includes a particular number N of block vector candidates (e.g., 2, 3, 4, 5, 6, 7, or 8).

For instance, when generating the plurality of block vector predictor candidates, Intra BC unit 48 may first evaluate block vectors of neighboring blocks for inclusion in the block vector candidate list for the current block. For example, Intra BC unit 48 may evaluate block vectors of neighboring blocks (e.g., a left neighboring block and/or an above neighboring block) for inclusion in the block vector candidate list for the current block by determining whether the neighboring blocks include block vectors available for use as block vector predictor candidates for the current block.

In some examples, Intra BC unit 48 may determine whether a neighboring block includes a block vector that is available for use as a block vector predictor candidate for the current block based on one or more aspects of the neighboring block, such as whether the neighboring block is coded using Intra BC, whether the neighboring block is included in the same CTU as the current block, and whether the block vector of the neighboring block is the same a block vector predictor candidate already included in the block vector candidate list for the current block. For instance, Intra BC unit 48 may determine that a neighboring block includes a block vector that is available for use as a block vector predictor candidate for the current block where the neighboring block is coded using Intra BC, is included in the same CTU as the current block, and where the block vector of the neighboring block is not the same a block vector predictor candidate already included in the block vector candidate list for the current block.

In some examples, if, after evaluating the block vectors of the neighboring blocks, Intra BC unit 48 has not selected the particular number N of block vector candidates, e.g., if one or more block vectors of neighboring blocks are unavailable, Intra BC unit 48 may evaluate block vectors of previously coded blocks for inclusion in the block vector candidate list for the current block based on whether the previously coded blocks include block vectors available for use as block vector predictor candidates for the current block. For example, Intra BC unit 48 may evaluate block vectors of previously coded blocks for inclusion in the block vector candidate list for the current block by determining whether the previously coded blocks include block vectors available for use as block vector predictor candidates for the current block.

In some examples, Intra BC unit 48 may determine whether a previously coded block includes a block vector that is available for use as a block vector predictor candidate for the current block based on one or more aspects of the previously coded block, such as whether the previously coded block is coded using Intra BC, whether the previously coded block is included in the same CTU as the current block, and whether the block vector of the previously coded block is the same a block vector predictor candidate already included in the block vector candidate list for the current block. For instance, Intra BC unit 48 may determine that a previously coded block includes a block vector that is available for use as a block vector predictor candidate for the current block where the previously coded block is coded using Intra BC, is included in the same CTU as the current block, and where the block vector of the previously coded block is not the same a block vector predictor candidate already included in the block vector candidate list for the current block.

In some examples, Intra BC unit 48 may evaluate block vectors of a particular number of blocks (e.g., 1, 2, 3, or 4) of the same CTU as the current block that are coded using Intra BC for inclusion in the block vector candidate list for the current block. In some examples, such as where the current block is a first block in a CTU to be coded using Intra BC, Intra BC unit 48 may determine that there are no block vectors of previously coded blocks available for use as a block vector predictor candidates for the current block. Similarly, where Intra BC unit 48 evaluates block vectors of two blocks previously coded using Intra BC and where the current block is a second block in a CTU to be coded using Intra BC, Intra BC unit 48 may determine that there it at most one block vector of a previously coded block available for use as a block vector predictor candidate for the current block.

In some examples, if, after evaluating the block vectors of the previously decoded blocks, Intra BC unit 48 has not selected the particular number N of block vector candidates, e.g., if one or more block vectors of the previously decoded blocks are unavailable, Intra BC unit 48 may evaluate default block vectors for inclusion in the block vector candidate list for the current block. Some example default block vectors include, but are not limited to (−2w, 0), (2w, 0), (−w, 0), (w, 0), (0, −h), (0, −2h), (0, h), (0, 2h), (−8, 0), (0, 8), (0, 0), where w and h correspond to the width and height, respectively, of the current block. In some examples, the default block vectors may be referred to a predefined block vectors (i.e., because their values are predefined). As one example, where Intra BC unit 48 evaluates block vector predictor candidates from the different groups in a particular order until the particular number N of block vector candidates are selected and Intra BC unit 48 has selected N−1 block vector candidates for inclusion in the block vector candidate list for the current block, Intra BC unit 48 may select a first default block vector (e.g., −2w, 0) for inclusion in the block vector candidate list for the current block. As another example, where Intra BC unit 48 evaluates block vector predictor candidates from the different groups in a particular order until the particular number N of block vector candidates are selected and Intra BC unit 48 has selected N−2 block vector candidates for inclusion in the block vector candidate list for the current block, Intra BC unit 48 may select a first default block vector (e.g., −2w, 0) and a second default block vector (e.g., −w, 0) for inclusion in the block vector candidate list for the current block. In this way, Intra BC unit 48 may determine a plurality of block vector predictor candidates selected from block vectors of neighboring blocks, block vectors of previously coded blocks, and default block vectors.

In some examples, Intra BC unit 48 may select a particular block vector predictor candidate from the plurality of block vector predictor candidates. For instance, Intra BC unit 48 may select the particular block vector predictor candidate as the block vector predictor candidate from the plurality of block vector predictor candidates that is the best match to the block vector for the current block. For instance, Intra BC unit 48 may determine which block vector predictor candidate from the plurality of block vector predictor candidates has a value closest to a value of the block vector for the current block.

In any case, Intra BC unit 48 may cause entropy encoding unit 56 may encode syntax elements to indicate which of the plurality of block vector candidates was selected and to indicate the difference between the block vector for the current block and the selected particular block vector candidate. In this way, Intra BC unit 48 and entropy encoding unit 56 may reduce the amount of data needed to code the block vector.

Figure 3:
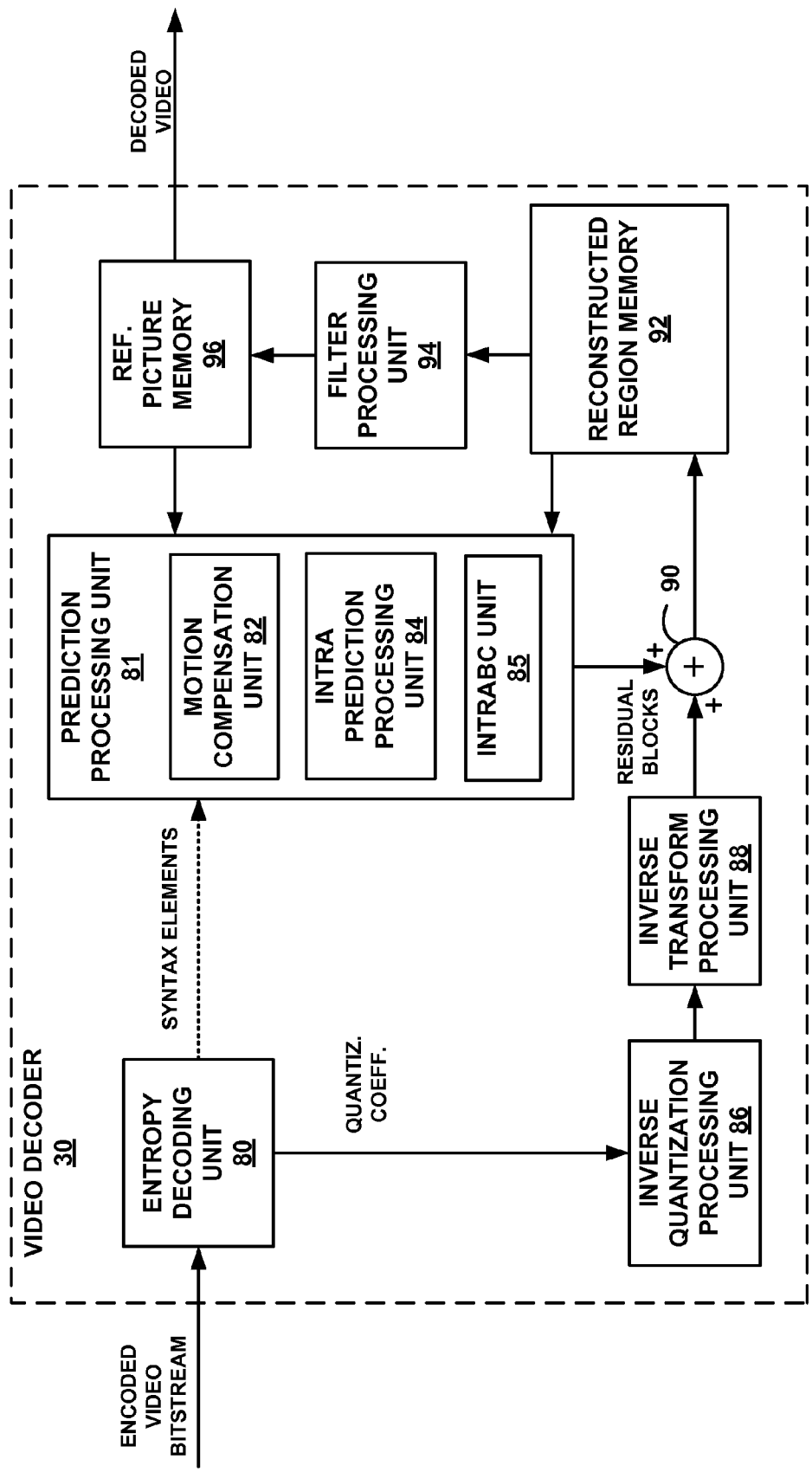
FIG. 3 is a block diagram illustrating an example video decoder that may implement one or more techniques described in this disclosure.

FIG. 3 is a block diagram illustrating an example video decoder 30 that may implement the techniques described in this disclosure. In the example of FIG. 3, video decoder 30 includes entropy decoding unit 80, prediction processing unit 81, inverse quantization processing unit 86, inverse transform processing unit 88, summer 90, reconstructed region memory 92, filter processing unit 94, and reference picture memory 96. Prediction processing unit 81 includes motion compensation unit 82, intra prediction processing unit 84, and an Intra Block Copy (Intra BC) unit 85. Video decoder 30 may, in some examples, perform a decoding pass generally reciprocal to the encoding pass described with respect to video encoder 20 from FIG. 2.

In various examples, a unit of video decoder 30 may be tasked to perform the techniques of this disclosure. Also, in some examples, the techniques of this disclosure may be divided among one or more of the units of video decoder 30. For example, Intra BC unit 85 may perform the techniques of this disclosure, alone, or in combination with other units of video decoder 30, such as motion compensation unit 82, intra prediction processing unit 84, reconstructed region memory 92, and entropy decoding unit 80.

During the decoding process, video decoder 30 receives an encoded video bitstream that represents video blocks of an encoded video slice and associated syntax elements from video encoder 20. Entropy decoding unit 80 of video decoder 30 entropy decodes the bitstream to generate quantized coefficients, motion vectors for inter prediction, block vectors for Intra BC prediction, and other syntax elements described herein. Entropy decoding unit 80 may perform the inverse of any of the techniques described herein for binarization and encoding of syntax elements, including vector components, flags, and other syntax elements, for the prediction according to the Intra BC mode. Entropy decoding unit 80 forwards the vectors and other syntax elements to prediction processing unit 81. Video decoder 30 may obtain the syntax elements at the sequence level, the picture level, the video slice level and/or the video block level.

In accordance with one or more aspects of the techniques described in this disclosure, as opposed to decoding a value of a block vector using the motion vector difference (MVD) coding method in HEVC, entropy decoding unit 80 may decode the value of a block vector using a decoding method tailored to the characteristics of block vectors for Intra BC mode. For example, as opposed to decoding a value of a block vector based on four syntax elements, entropy decoding unit 80 may decode the value of a block vector based on three syntax elements.

As discussed above, a component of the encoded block vector may represent a displacement between a predictor block of video data and the current block of video data. The predictor block may be within the same picture as the current block. The block vector may be a two-dimensional block vector that includes a horizontal component and a vertical component or the block vector may be a one-dimensional block vector that includes a horizontal component or a vertical component. The horizontal component may represent a horizontal displacement between the predictor block of video data and the current block of video data. The vertical component may represent a vertical displacement between the predictor block of video data and the current block of video data. Entropy decoding unit 80 may decode one or both of the horizontal component and the vertical component.

In some examples, entropy decoding unit 80 using a process that is generally reciprocal to the encoding process used by entropy encoding unit 56 of encoder 20 to encode the block vector. For instance, entropy decoding unit 80 may decode the component of the block vector based on three syntax elements.

Entropy decoding unit 80 may decode the component of the block vector based on a first syntax element. In some examples, the first syntax element may indicate that an absolute value of a block vector component is non-zero. In some examples, such as where the first syntax element is one, entropy decoding unit 80 may determine that the absolute value of the component is greater than zero. In some examples, such as where the first syntax element is zero, entropy decoding unit 80 may determine that the absolute value of the component is not greater than zero.

In some examples, entropy decoding unit 80 may receive the first syntax element from entropy decoding unit 80 which may decode the first bin value using context-adaptive binary arithmetic coding (CABAC) with a context. In some of such examples, entropy decoding unit 80 may decode both a first syntax element for the horizontal component and a first syntax element for the vertical component with separate contexts. In other of such examples, entropy decoding unit 80 may decode both the first syntax element for the horizontal component and the first syntax element for the vertical component with the same context.

Entropy decoding unit 80 may decode the component of the block vector based on a second syntax element. In some examples, the second syntax element may represent a function of the absolute value of the component. For instance, the second syntax element may represent the absolute value of the component minus an offset. In some examples, the offset may be one.

In some examples, entropy decoding unit 80 may decode the one or more subsequent bin values using unary codes, exponential Golomb codes, or Rice-Golomb codes. In some examples, the order of the exponential Golomb codes, or the order of the Rice-Golomb codes used by entropy decoding unit 80 may be based on a size of the CU associated with the current video block. In some examples, entropy decoding unit 80 may decode the one or more subsequent bin values using exponential Golomb codes with parameter three in bypass mode.

Entropy decoding unit 80 may decode the component of the block vector based on a third syntax element. In some examples, the third syntax element may indicate a sign of the component. In other words, the third syntax element may indicate whether the component is positive or negative.

In some examples, entropy decoding unit 80 may decode the third syntax element using context-adaptive binary arithmetic coding (CABAC) with a context. In some of such examples, entropy decoding unit 80 may decode both a third syntax element for the horizontal component and a third syntax element for the vertical component with separate contexts. In other of such examples, entropy decoding unit 80 may decode both the third syntax element for the horizontal component and the third syntax element for the vertical component with the same context.

Entropy decoding unit 80 may decode the component of the block vector based on a fourth syntax element that indicates whether or not the absolute value of the component is one. In such examples, the offset used by entropy decoding unit 80 to generate the second syntax element may be two.

In some examples, entropy decoding unit 80 may decode the fourth syntax element using context-adaptive binary arithmetic coding (CABAC) with a context. In some of such examples, entropy decoding unit 80 may decode both a fourth syntax element for the horizontal component and a fourth syntax element for the vertical component with separate contexts. In other of such examples, entropy decoding unit 80 may decode both the fourth syntax element for the horizontal component and the fourth syntax element for the vertical component with the same context.

In some examples, as opposed to indicating that the absolute value of a block vector component is non-zero, the first syntax element may indicate that the second syntax element represents a function of the component.

As one example, entropy decoding unit 80 may determine whether the second syntax element represents a value of the component minus an offset based on the first syntax element. In some examples, such as where the first syntax element is one, entropy decoding unit 80 may determine that the second syntax element represents the value of the component minus the offset. In some examples, such as where the first syntax element is zero, entropy decoding unit 80 may determine that the second syntax element represents the value of the component (without the offset).

As another example, entropy decoding unit 80 may determine whether the second syntax element represents the absolute value of the component minus an offset based on the first syntax element. In some examples, such as where the first syntax element is one, entropy decoding unit 80 may determine that the second syntax element represents the absolute value of the component minus the offset. In some examples, such as where the first syntax element is zero, entropy decoding unit 80 may determine that the second syntax element represents the absolute value of the component (without the offset).

In some examples, entropy decoding unit 80 may decode both the horizontal component and the vertical component, and the horizontal component and the vertical component may share the same first syntax element. In some examples, entropy decoding unit 80 may decode both the horizontal component and the vertical component, and the horizontal component and the vertical component may not share the same first syntax element, and may have separate first syntax elements.

In some examples, the offset used by entropy decoding unit 80 may correspond to a predetermined value. As one example, where the plurality of syntax elements includes the first syntax element and the second syntax element, but not the fourth syntax element, the offset used for the value indicated by the second syntax element may be one. As another example, where the plurality of syntax elements includes the first syntax element, the second syntax element, and the fourth syntax element, the offset may be two. In some examples, the offset used by entropy decoding unit 80 may be based on one or more properties of the video data. For instance, the offset may correspond to a width of the CU multiplied by negative one. In some examples, entropy decoding unit 80 may decode both the horizontal component and the vertical component, and the offset for the horizontal component may be the same as the offset for the vertical component. In some examples, entropy decoding unit 80 may decode both the horizontal component and the vertical component, and the offset for the horizontal component may not be the same as the offset for the vertical component.

In some examples, as opposed to decoding syntax elements to represent the value of a block vector, entropy decoding unit 80 may decode syntax elements to represent a difference between the value of the block vector and a block vector predictor. In some examples, the block vector predictor may be a previously coded block vector (i.e., in a coding order). For instance, to decode the value of a block vector for a current block, entropy decoding unit 80 may decode one or more syntax elements that indicate the difference between the block vector and the previously coded block vector, and Intra BC unit 85 may determine the block vector based on the difference and the previously coded block vector.

However, in some examples, it may be desirable to utilize block vector predictors other than the previously coded block vector. As one example, in some situations, it may be desirable to use a block vector of a neighboring block as a block vector predictor. For instance, the difference between a block vector of a current block and a block vector of a neighboring block may be less than the difference between the block vector and the current block and the previously coded block vector. As another example, for some blocks, it may not be possible to use either a previously coded block vector or a block vector of a neighboring block as a block vector predictor. For instance, there may not be a previously coded block vector or block vector of a neighboring block available for use as a block vector predictor for the first block in a coding tree unit (CTU) coded using Intra BC.

In accordance with one or more techniques of this disclosure, as opposed to always using the previously coded block vector as the block vector predictor when decoding a block of video data, Intra BC unit 80 may utilize a plurality of block vector predictor candidates. For instance, Intra BC unit 80 may construct a block vector candidate list for the current block that includes a plurality of block vector predictor candidates, and entropy decoding unit 80 may decode plurality of syntax elements that indicate which block vector predictor candidate of the plurality of block vector predictor candidates is selected and a difference between the block vector and the selected block vector predictor candidate. Intra BC unit 80 may determine the particular block vector predictor candidate from the plurality of block vector predictor candidates based on one of the syntax elements and determine the block vector for the current block based on the selected particular block vector predictor candidate and the difference indicated by the syntax elements.

In some examples, Intra BC unit 80 may generate the plurality of block vector predictor candidates using techniques similar to Intra BC unit 48 of video encoder 20. In this way, the block vector candidate list for the current block generated by Intra BC unit 80 may be identical to the plurality of block vector predictor candidates generated by Intra BC unit 48. For instance, in some examples, Intra BC unit 80 may select the plurality of block vector candidates from a plurality of different groups, such as block vector predictor candidates from block vectors of neighboring blocks, block vectors of previously coded blocks, and default block vectors. In some examples, Intra BC unit 80 may evaluate block vector predictor candidates from the different groups in a particular order until a particular number N of block vector candidates (e.g., 2, 3, 4, 5, 6, 7, or 8) are selected.

For instance, when generating the plurality of block vector predictor candidates, Intra BC unit 80 may first evaluate block vectors of neighboring blocks for inclusion in the block vector candidate list for the current block. For example, Intra BC unit 48 may evaluate block vectors of neighboring blocks (e.g., a left neighboring block and/or an above neighboring block) for inclusion in the block vector candidate list for the current block by determining whether the neighboring blocks include block vectors available for use as block vector predictor candidates for the current block.

In some examples, Intra BC unit 80 may determine whether a neighboring block includes a block vector that is available for use as a block vector predictor candidate for the current block based on one or more aspects of the neighboring block, such as whether the neighboring block is coded using Intra BC, whether the neighboring block is included in the same CTU as the current block, and whether the block vector of the neighboring block is the same a block vector predictor candidate already included in the block vector candidate list for the current block. For instance, Intra BC unit 80 may determine that a neighboring block includes a block vector that is available for use as a block vector predictor candidate for the current block where the neighboring block is coded using Intra BC, is included in the same CTU as the current block, and where the block vector of the neighboring block is not the same a block vector predictor candidate already included in the block vector candidate list for the current block.

In some examples, if, after evaluating the block vectors of the neighboring blocks, Intra BC unit 80 has not selected the particular number N of block vector candidates, e.g., if one or more block vectors of neighboring blocks are unavailable, Intra BC unit 80 may evaluate block vectors of previously coded blocks for inclusion in the block vector candidate list for the current block based on whether the previously coded blocks include block vectors available for use as block vector predictor candidates for the current block. For example, Intra BC unit 80 may evaluate block vectors of previously coded blocks for inclusion in the block vector candidate list for the current block by determining whether the previously coded blocks include block vectors available for use as block vector predictor candidates for the current block.

In some examples, Intra BC unit 80 may determine whether a previously coded block includes a block vector that is available for use as a block vector predictor candidate for the current block based on one or more aspects of the previously coded block, such as whether the previously coded block is coded using Intra BC, whether the previously coded block is included in the same CTU as the current block, and whether the block vector of the previously coded block is the same a block vector predictor candidate already included in the block vector candidate list for the current block. For instance, Intra BC unit 80 may determine that a previously coded block includes a block vector that is available for use as a block vector predictor candidate for the current block where the previously coded block is coded using Intra BC, is included in the same CTU as the current block, and where the block vector of the previously coded block is not the same a block vector predictor candidate already included in the block vector candidate list for the current block.

In some examples, Intra BC unit 80 may evaluate block vectors of a particular number of blocks (e.g., 1, 2, 3, or 4) of the same CTU as the current block that are coded using Intra BC for inclusion in the block vector candidate list for the current block. In some examples, such as where the current block is a first block in a CTU to be coded using Intra BC, Intra BC unit 80 may determine that there are no block vectors of previously coded blocks available for use as block vector predictor candidates for the current block. Similarly, where Intra BC unit 80 evaluates block vectors of two blocks previously coded using Intra BC and where the current block is a second block in a CTU to be coded using Intra BC, Intra BC unit 80 may determine that there it at most one block vector of a previously coded block available for use as a block vector predictor candidate for the current block.

In some examples, if, after evaluating the block vectors of the previously decoded blocks, Intra BC unit 80 has not selected the particular number N of block vector candidates, e.g., if one or more block vectors of the previously decoded blocks are unavailable, Intra BC unit 80 may evaluate default block vectors for inclusion in the block vector candidate list for the current block. Some example default block vectors include, but are not limited to (−2w, 0), (2w, 0), (−w, 0), (w, 0), (0, −h), (0, −2h), (0, h), (0, 2h), (−8, 0), (0, 8), (0, 0), where w and h correspond to the width and height, respectively, of the current block. As one example, where Intra BC unit 80 evaluates block vector predictor candidates from the different groups in a particular order until the particular number N of block vector candidates are selected and Intra BC unit 80 has selected N−1 block vector candidates for inclusion in the plurality of block vector predictor candidates, Intra BC unit 80 may select a first default block vector (e.g., −2w, 0) for inclusion in the block vector candidate list for the current block. As another example, where Intra BC unit 80 evaluates block vector predictor candidates from the different groups in a particular order until the particular number N of block vector candidates are selected and Intra BC unit 80 has selected N−2 block vector candidates for inclusion in the block vector candidate list for the current block, Intra BC unit 80 may select a first default block vector (e.g., −2w, 0) and a second default block vector (e.g., −w, 0) for inclusion in the block vector candidate list for the current block. In this way, Intra BC unit 80 may determine a plurality of block vector predictor candidates selected from block vectors of neighboring blocks, block vectors of previously coded blocks, and default block vectors.

In some examples, Intra BC unit 80 may select a particular block vector predictor candidate from the block vector candidate list for the current block. For instance, Intra BC unit 80 may select the particular block vector predictor candidate based on one or more of the received syntax elements. For instance, Intra BC unit 80 may select the particular block vector predictor candidate based on a received syntax element that indicates which block vector predictor candidate from the plurality of block vector predictor candidates was selected by Intra BC unit 48 of video encoder 20.

In any case, Intra BC unit 80 may determine the value of the block vector for the current block based on the selected block vector predictor candidate and the difference indicated by the syntax elements (i.e., the difference between the selected block vector predictor and the block vector for the current block). In this way, entropy decoding unit 80 and Intra BC unit 80 may decode an encoded block vector.

When the video slice is coded as an intra-coded (I) slice, intra prediction unit 84 of prediction processing unit 81 may generate prediction data for a video block of the current video slice based on a signaled intra prediction mode and data from previously decoded blocks of the current frame or picture. When the video frame is coded as an inter-coded (i.e., B or P) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, RefPicList0 and RefPicList1, using default construction techniques or any other technique based on reference pictures stored in reference picture memory 96. When the video block is coded according to the Intra BC mode described herein, Intra BC unit 85 of prediction processing unit 81 produces predictive blocks for the current video block based on block vectors and other syntax elements received from entropy decoding unit 80. The predictive blocks may be within a reconstructed region within the same picture as the current video block defined by video encoder 20, and retrieved from reconstructed region memory 92.

Motion compensation unit 82 and Intra BC unit 85 determine prediction information for a video block of the current video slice by parsing the vectors and other syntax elements, and use the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice. Similarly, Intra BC unit 85 may use some of the received syntax elements, e.g., a flag, to determine that the current video block was predicted using the Intra BC mode, construction information indicating which video blocks of the picture are within the reconstructed region and should be stored in reconstructed region memory 92, block vectors for each Intra BC predicted video block of the slice, Intra BC prediction status for each Intra BC predicted video block of the slice, and other information to decode the video blocks in the current video slice.

Motion compensation unit 82 and Intra BC unit 85 may also perform interpolation based on interpolation filters. Motion compensation unit 82 and Intra BC unit 85 may use interpolation filters as used by video encoder 20 during encoding of the video blocks to calculate interpolated values for sub-integer pixels of predictive blocks. In this case, motion compensation unit 82 and Intra BC unit 85 may determine the interpolation filters used by video encoder 20 from the received syntax elements and use the interpolation filters to produce predictive blocks.

Inverse quantization processing unit 86 inverse quantizes, i.e., dequantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After motion compensation unit 82 or Intra BC unit 85 generates the predictive block for the current video block based on the vectors and other syntax elements, video decoder 30 forms a decoded video block by summing the residual blocks from inverse transform processing unit 88 with the corresponding predictive blocks generated by motion compensation unit 82 and Intra BC unit 85. Summer 90 represents the component or components that perform this summation operation to produce reconstructed video blocks.

Reconstructed region memory 92 stores reconstructed video blocks according to the definition of the reconstructed region for Intra BC of a current video block by video encoder 20, as described herein. Reconstructed region memory 92 may store reconstructed video blocks that have not been in-loop filtered by filter processing unit 394. Summer 90 may provide the reconstructed video blocks to filter processing unit 94 in parallel with reconstructed region memory 92, or reconstructed region memory 92 may release the reconstructed video blocks to filter processing unit 94 when no longer needed for the reconstructed region for Intra BC. In either case, Intra BC unit 85 retrieves a predictive video block for a current video block from reconstructed region memory 92.

Filter processing unit 94 may perform in-loop filtering on the reconstructed video blocks. In-loop filtering may include deblock filtering to filter block boundaries to remove blockiness artifacts from reconstructed video. In-loop filtering may also include SAO filtering to improve the reconstructed video. Reconstructed blocks, some of which may be in-loop filtered, may be stored in reference picture memory 68 as reference pictures. The reference pictures may include reconstructed blocks that may be used by motion compensation unit 82 as predictive blocks to inter-predict a block in a subsequent video frame or picture. Reference picture memory 96 also stores decoded video for later presentation on a display device, such as display device 31 of FIG. 1.

Figure 4A:
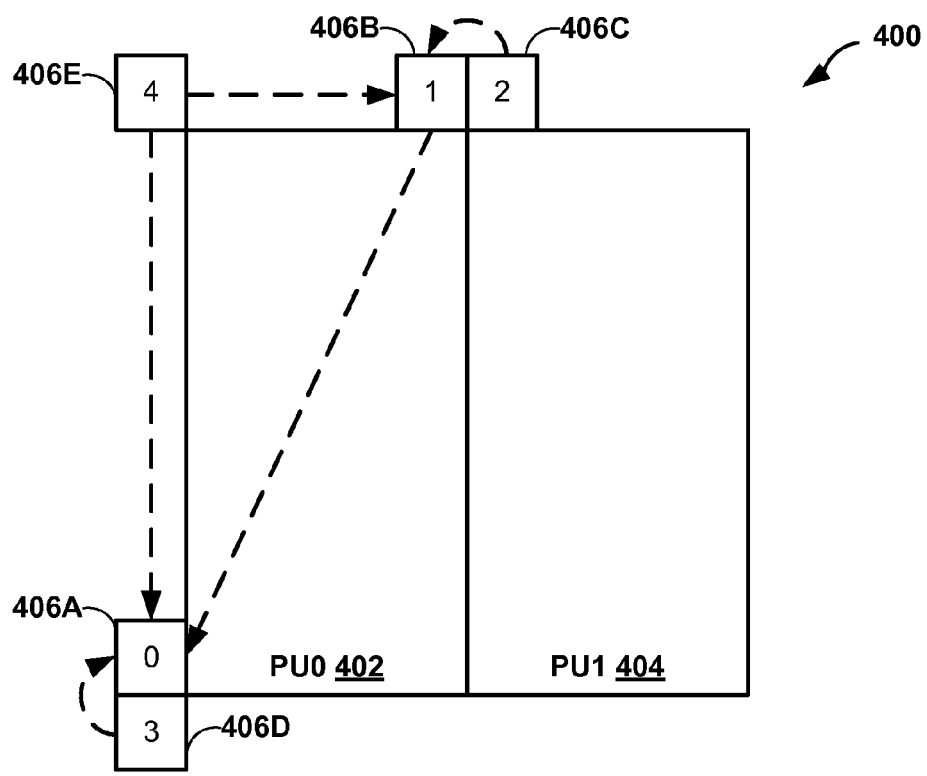
FIGS. 4A and 4B illustrate an example of an intra-prediction process, in accordance with one or more techniques of the present disclosure.
Figure 4B:
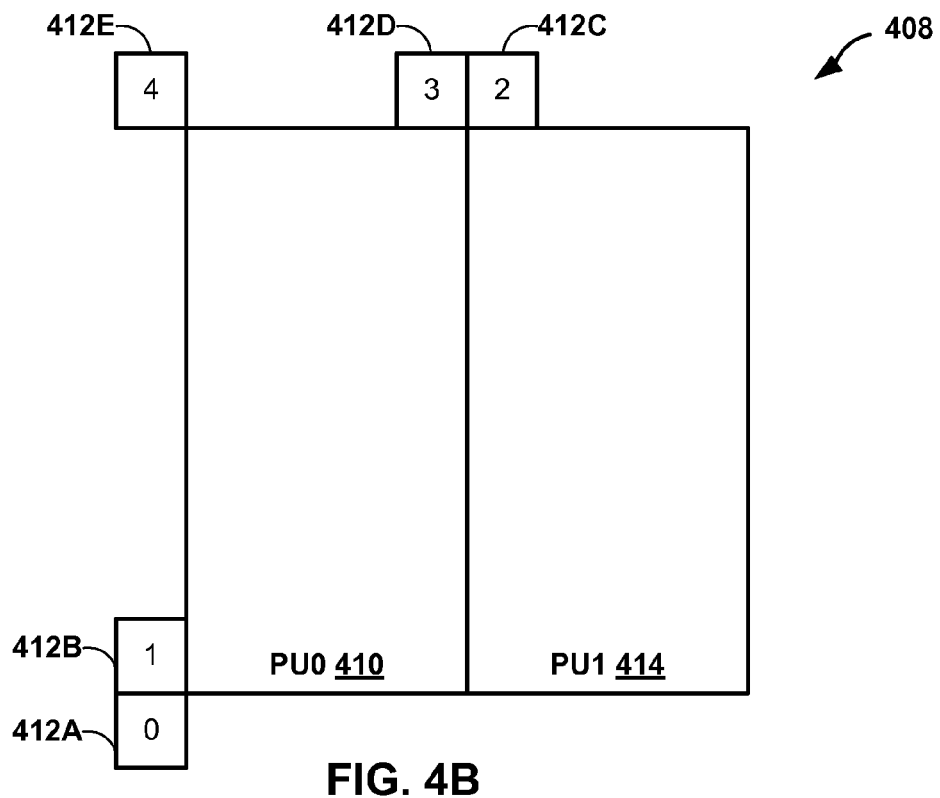

FIGS. 4A and 4B illustrate an example of an intra-prediction process in accordance with the techniques of the present disclosure. As illustrated in FIGS. 4A and 4B, prediction unit (PU) 0 402 of picture 400 may have neighboring blocks 406A-406E (collectively, "neighboring blocks 406") and prediction unit (PU) 0 410 of picture 408 may have neighboring blocks 412A-412E (collectively, "neighboring blocks 412").

In the HEVC standard, there may be two inter-prediction modes, referred to as merge mode (skip may be considered a special case of merge) and advanced motion vector prediction (AMVP) mode for a prediction unit (PU).

In either AMVP or merge mode, a motion vector (MV) candidate list may be maintained for multiple MV predictors. The MV(s), as well as reference indices in the merge mode, of the current PU may be generated by taking one candidate from the MV candidate list.

The MV candidate list may contain up to a first number of candidates for merge mode and a second number of candidates for AMVP mode. For example, the MVC candidate list may contain up to five candidates for the merge mode and only two candidates for the AMVP mode. A merge candidate may contain a set of motion information, e.g., motion vectors corresponding to both reference picture lists (list 0 and list 1) and the reference indices. If a merge candidate is identified by a merge index, the reference pictures may be used for the prediction of the current blocks, as well as for determining the associated MVs. However, under AMVP mode, for each potential prediction direction from either list 0 or list 1, a reference index may be explicitly signaled, together with an MVP index to the MV candidate list, since the AMVP candidate may contain only a MV. In AMVP mode, the predicted MVs may be further refined.

Accordingly, a merge candidate may correspond to a full set of motion information while an AMVP candidate may contain just one MV for a specific prediction direction and reference index.

The candidates for both merge mode and AMVP mode may be derived similarly from the same spatial and temporal neighboring blocks.

As shown in FIGS. 4A and 4B, spatial MV candidates for PU0 402 may be derived from neighboring blocks 406 and spatial MV candidates for PU0 410 may be derived from neighboring blocks 412, although the techniques for generating the candidates from the blocks may differ for merge and AMVP modes. For instance, FIG. 4A shows an exemplary derivation of spatial neighboring MV candidates for merge mode, whereas FIG. 4B shows an exemplary derivation of spatial neighboring MV candidates for AMVP mode.

In merge mode, up to four spatial MV candidates may be derived with the order shown (with numbers) in FIG. 4A. For example, the order may be as follows: left neighboring block 406A (0), above neighboring block 406B (1), above right neighboring block 406C(2), below left neighboring block 406D (3), and above left neighboring block 406E(4).

In AMVP mode, the neighboring blocks may be divided into two groups: (1) a group toward the left that includes below left neighboring block 412A (0) and left neighboring block 412B (1) (hereinafter "the left block vector"); and (2) a group toward the top that includes above right neighboring block 412C (2), the above neighboring block 412D (3), and the above left neighboring block 412E (4) (hereinafter "the above block vector"), as shown in FIG. 4B. For each group, the potential MV candidate in a neighboring block referring to the same reference picture as that indicated by the signaled reference index may have the highest priority to be chosen to form a final MV candidate of the group. It is possible that the neighboring blocks do not contain a MV pointing to the same reference picture. Thus, if such a candidate cannot be found, the first available MV candidate may be scaled to form the final MV candidate, and the temporal distance differences may be compensated.

In some examples, the MV may be derived for the luma component of a current PU/CU, before it is used for chroma motion compensation, and the MV may be scaled based on the chroma sampling format.

FIG. 5 illustrates an example of an intra-prediction process including Intra BC, in accordance with one or more techniques of the present disclosure. According to one example intra-prediction process, video encoder 20 may select a predictor video block, e.g., from a set of previously coded and reconstructed blocks of video data. In the example of FIG. 5, reconstructed region 108 includes the set of previously coded and reconstructed video blocks. The blocks in the reconstructed region 108 may be blocks that have been decoded and reconstructed by video decoder 30 and stored in reconstructed region memory 92, or blocks that have been decoded and reconstructed in the reconstruction loop of video encoder 20 and stored in reconstructed region memory 64. Current block 102 is a current video block to be coded. Predictor block 104 is a reconstructed video block, in the same picture as current block 102, which is used for Intra BC prediction of current block 102. In some examples, predictor block 104 may be referred to as a "prediction signal." In some examples, predictor block 104 may be reconstructed but without in-loop filtering, including deblocking and Sample Adaptive Offset (SAO). For the luma component and the chroma components that are coded with Intra BC, the block compensation may be done with integer block compensation or the like. As such, interpolation may not be needed. In some examples, the block vector may be predicted and signalled at the integer level.

In the example intra-prediction process, video encoder 20 may determine and encode block vector 106, which indicates the position of predictor block 104 relative to current block 102, together with the residue signal. For instance, as illustrated by FIG. 5, block vector 106 may indicate the position of the upper-left corner of predictor block 104 relative to the upper-left corner of current block 102. As discussed above, block vector 106 may also be referred to as an offset vector, displacement vector, or motion vector (MV). Video decoder 30 utilizes the encoded information for decoding the current CU.

In accordance with one or more techniques of this disclosure, the efficiency of block vector coding may be improved by implementing a coding scheme in view of the characteristics of Intra BC block vector fields. The techniques of this disclosure may be implemented separately or in combination. For example, video encoder 20 and video decoder 30 may implement each technique separately, or may implement one or more techniques in combination. For example, this disclosure proposes several techniques to more efficiently code block vectors.

These techniques may be implemented by an entropy encoding unit of video encoder 20, or by an entropy decoding unit of video decoder 30. In other examples, these techniques may be implemented by a prediction processing unit of video encoder 20, or by a prediction processing unit of video decoder 30. In some examples, these techniques may be implemented by any combination of units of video encoder 20 and video decoder 30. For instance, in examples where video encoder 20 and video decoder 30 are implemented as an integrated circuit (IC) or a micro-controller, the techniques may be implemented by one or more units of the IC or micro-controller, which may be hard-coded logic.

As discussed above, as opposed to coding the full value of a block vector, such as block vector 106, a video coder (e.g., a video encoder or a video decoder) may code a difference between the full value of the block vector and a block vector predictor. In some examples, the block vector predictor may be set to (−w, 0) at the beginning of each CTU, where w is the width of the coding unit (CU). Such a block vector predictor may be updated to be the block vector of the latest coded CU if the CU is coded with Intra BC. If the CU is not coded with Intra BC, the block vector predictor may remain unchanged. After block vector prediction, the block vector difference may be encoded using the MV difference coding method in HEVC or the like.

The current Intra BC may be enabled at both the CU and PU level. For the PU level Intra BC, the 2N×N and N/2N PU partition may be supported for each of the CU sizes. In addition, when the CU is the smallest CU, the N×N PU partition may be supported.

As also discussed above, in some examples, the block vector predictor for a current block may be selected from a plurality of block vector predictors. For instance, as described in Zhu et al., "Initialization of block vector predictor for intra block copy," Document: JCTVC-P0217, JCT-VC of ITU-T SG 16 WP 3 and ISO/IEC JTC 1/SC 29/WG 11, 16$^{th}$ Meeting: San José, US 9-17 Jan. 2014 (hereinafter "JCTVC-P0217"), available at http://phenix.it-sudparis.eu/jct/doc_end_user/documents/16_San%20Jose/wg11/JCTVC-P0217-v2.zip, the plurality of block vector predictors may include the two most recently coded block vectors, referred to as PMV0 (being the most recently coded block vector) and PMV1 (being the second most recently coded block vector). According to JCTVC-P0217, two block vector predictors, instead of one, may be maintained. In addition, a flag may be signalled to indicate which predictor is to be used. Also according to JCTVC-P0217, when a new block vector predictor is coded, the value of PMV1 will be replaced by the value of PMV0 (i.e., PMV1=PMV0), and the value of PMV0 is replaced by the new block vector predictor (i.e., PMV0=NewMV).

In some examples, as opposed to using previously coded block vectors, neighboring block vectors may be used as block vector predictors. For instance, as described in Pang et al., "Non-RCE3: Block vector signaling for intra block copy," Document: JCTVC-P0149, JCT-VC of ITU-T SG 16 WP 3 and ISO/IEC JTC 1/SC 29/WG 11, 16$^{th}$ Meeting: San José, US 9-17 Jan. 2014 (hereinafter "JCTVC-P0149"), either a left or above block vector may be selected as a block vector predictor. Additionally, as described in JCTVC-P0149, if one of the block vectors is unavailable, then a default block vector (e.g., (−2w, 0)) may be used instead. If both of the block vectors are unavailable, then two default block vectors (e.g., (−2*w, 0) and (−w, 0)) may be used instead, where w corresponds to the CU width.

In some examples, the techniques described by JCTVC-P0217 and JCTVC-P0149 may not be desirable. For instance, according to techniques described by JCTVC-P0217 and JCTVC-P0149, the block vector predictor candidates are either from spatially neighboring block vectors, or from previously encoded block vectors (within the same CTU). When Intra BC is enabled for an inter-slice, the predictor candidates can only be predicted from spatial neighbors.

In accordance with one or more techniques of this disclosure, for a CU/PU coded with Intra BC mode, a block vector candidate list like AMVP may be constructed. Such a list may be referred to as, for example, an Intra BC AMVP list. The maximum number of candidates may be fixed for the final candidate list, and may be a fixed number N (e.g., 2, 3, 4, 5, 6, 7, or 8). Each block vector predictor candidate may be from one or more of the following categories: the spatial neighbors, previously decoded CUs/PUs, or default block vectors.

Spatial neighbor block vectors may include block vectors from left neighboring blocks and block vectors from above neighboring blocks. Further details of spatial neighboring blocks are discussed below with reference to FIG. 6.

Default block vectors may include, but are not limited to, predefined block vectors, such as, for example: (−2w, 0), (2w, 0), (−w, 0), (w, 0), (0, −h), (0, −2h), (0, h), (0, 2h), (−8, 0), (0, 8), (0, 0), where w and h correspond to the width and height, respectively, of a current CU/PU.

With respect to previously decoded CUs or PUs that may be coded with Intra BC, the maximum number of previously decoded block vectors may be set to be N, which may be the size of an Intra BC AMVP list or the like. It is noted that the earliest decoded block vectors may be pruned (i.e., removed from the Intra BC AMVP list), and other block vectors with the same values may be pruned.

In accordance with one or more aspects of the present disclosure, temporal motion vector prediction (TMVP) for Intra BC may be implemented. For instance, a block vector for a current block in a current picture may be predicted based on a block vector predictor from a different picture. In one example, the temporal neighboring blocks may be accessed in the same way as in TMVP. For instance, a video coder may first check to see if the bottom-right block is coded with Intra BC; and if not, then the video coder may check to see if the center block is coded with Intra BC. When bi-directional prediction is implemented with one direction coded with Intra BC, the above TMVP for Intra BC may apply separately for each prediction direction. In another example, the video coder may only consider the center block for TMVP for Intra BC.

In related aspects, the video coder may consider the bottom-right block as unavailable if it does not belong to the CTU row that includes the block co-located with the current PU in the reference picture.

In further related aspects, when TMVP and Intra BC are both enabled/activated and the current slice is inter-coded, the video coder may merge a co-located merge candidate as either an Intra BC merge candidate or an inter-coded merge candidate, depending on whether the co-located block is coded with Intra BC or normal inter-prediction. When the co-located block is coded with the Intra BC, the merge candidate from TMVP may be an Intra BC candidate (e.g., may be associated with a reference index not equal to 0). When the co-located block is coded with normal inter-prediction, the merge candidate from TMVP may be an inter-prediction candidate (e.g., with reference index equal to 0).

In accordance with one or more aspects of the present disclosure, the order of the block vectors may be predefined in each set. In one example, in the set which includes the block vectors of spatially neighboring blocks with Intra BC mode, the left/above block vector group may be checked first. The above/left block vector group may then be checked. For instance, a video coder may first check a left neighboring block, and then check an above neighboring block.

In another example, in the set which includes the default block vectors, these block vectors may be checked in the following order: (−2w, 0), (2w, 0), (−w, 0), (w, 0), (0, −h), (0, −2h), (0, h), (0, 2h), (−8, 0), (0, 8), and (0,0). For instance, a video coder may first check (−2w, 0), and then check (−w, 0).

In yet another example, in the set which includes the previously decoded block vectors of blocks with Intra BC mode, the most recent encoded block vector may be checked first. Then the second most recent encoded block vector may be checked, followed by the third most recent encoded block vector, etc., e.g., until the candidate list contains a fixed number N of candidates.

In accordance with one or more aspects of the present disclosure, a video coder may construct the Intra BC AMVP list as follows. In a first approach, the video coder may check the sets of block vector candidates in a predefined order. When the number of block vector candidate in the Intra BC AMVP list is less than N, the video coder may add the block vectors in each set to the Intra BC AMVP list and block vectors with same values may be pruned.

In one example, when only the set of spatial neighbor blocks and the set of default block vectors are selected to construct the Intra BC AMVP list: first, the video coder may check the block vectors in the set of spatial neighbor blocks coded with Intra BC; and then, the video coder may check the block vectors in the set which includes the default block vectors.

In another example, when the set of spatial neighbors, the set of the previously decoded CUs/PUs, the default block vectors, and TMVP are selected to construct the Intra BC AMVP list: first, the video coder may check the block vectors in the set of spatial neighbor blocks; second, the video coder may check the block vectors in the set of previously decoded CUs/PUs with Intra BC mode; third, when current slice is inter-slice, the video coder may check the TMVP; and fourth, the video coder may check the block vectors in the set which includes the default block vectors.

In a second approach, the checking order of the sets of block vector candidates may be dependent on different slice types. For example, when the current slice is inter-slice, the video coder may check the TMVP first.

In accordance with one or more aspects of the present disclosure, a video coder may consider a predictor candidate as unavailable if it belongs to a block outside the current CTU (e.g., a block of a spatial neighbor or previously decoded).

In accordance with one or more aspects of the present disclosure, a video coder may consider a candidate as unavailable if it belongs to a block within the same CU as the current block. In related aspects, a video coder may consider a candidate as unavailable if it belongs to a block within the same CU as the current block, and the current CU size is smaller than a predefined size, such as, for example, 16×16.

In accordance with one or more aspects of the present disclosure, a video coder may maintain and use the candidates for Intra BC to predict the Intra BC block vector in a merge fashion, wherein the merge mode does not merge a reference index. Instead, the status of being Intra BC or not is part of the merge.

In related aspects, when bi-directional prediction is implemented, a merge candidate may contain one prediction direction to merge the Intra BC status and the block vector, while the other prediction direction is to merge the reference index and the motion vector. In addition, a merge candidate may contain one direction to merge the Intra BC status and one block vector, while the other direction is to merge the Intra BC status and another block vector.

In further related aspects, a video coder may put the merge candidate in the normal merge candidate list. For example, the candidate itself may be different and the other aspects of merge mode apply. This means that in an inter-coded slice, a merge candidate list may contain one normal merge candidate and one Intra BC candidate. After the merge candidate list is formed, the video coder may use the merge index to identify a merge candidate, which may be the Intra BC merge candidate or the normal merge (Inter) candidate. After the merge candidate is identified, the video coder may be able to determine whether the current block (CU or PU) is coded with Intra BC or not, and in such case, the video coder does not need to signal the flag indicating the current block is coded with Intra BC (intra_bc_flag or the like). In yet further related aspects, a video coder may generate the Intra BC AMVP list such that the Intra BC AMVP list contains the candidate that is predicted by Intra BC.

In accordance with one or more aspects of the present disclosure, a video coder may achieve more selective pruning by at least one of the following ways: by performing exhaustive pruning within one category, and by performing cross-category pruning by comparing the first one of each category.

In related aspects, a video coder may firstly insert a first candidate from a spatial/temporal neighbor into the list, when the video coder inserts a later candidate of such a type, the video coder may prune the later candidate by comparing only with the first candidate. In further related aspects, when a candidate from a previously decoded CU/PU is introduced, the video coder may first compare the candidate from the previously decoded CU/PU with the first candidate and then compared with the second candidate, being the first one from previously decoded CU/PU. In yet further related aspects, the video coder may insert the default candidates when the number of entries in the list is smaller than the target maximum number N.

Figure 6:
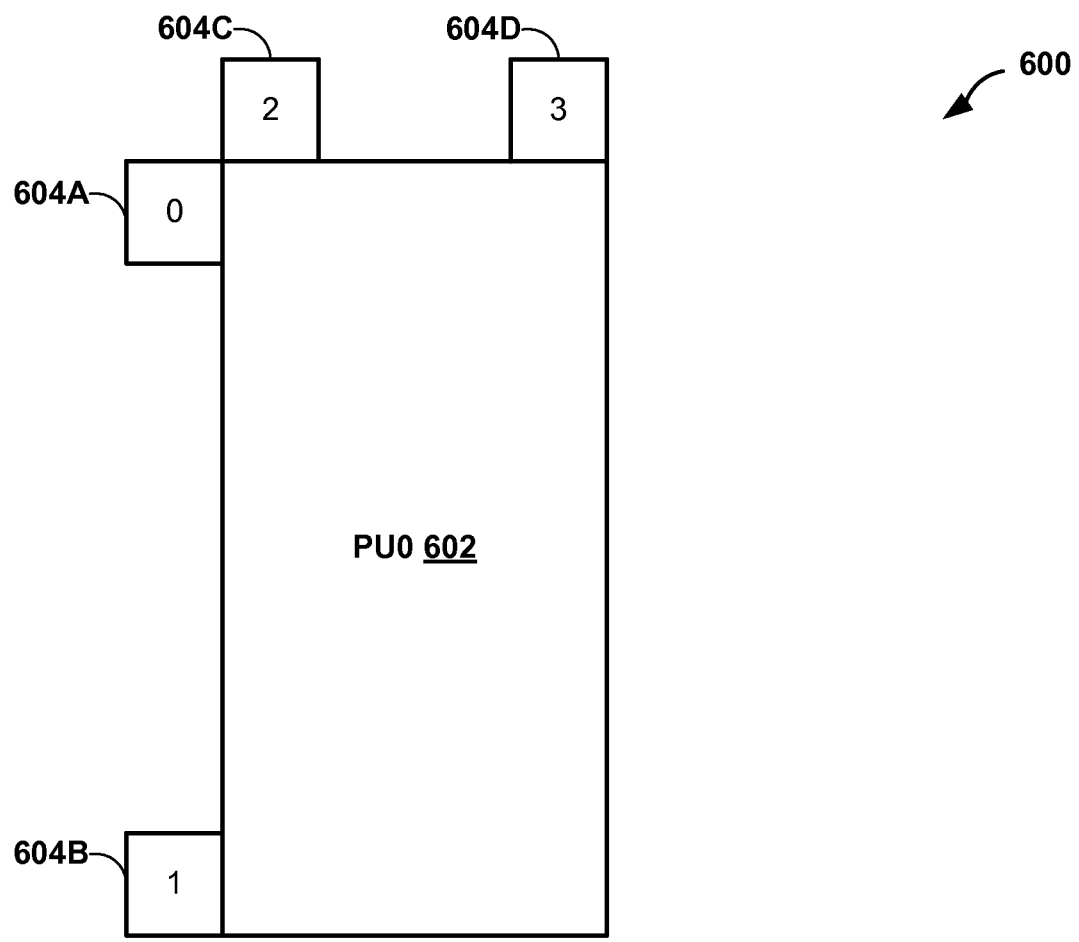
FIG. 6 illustrates an example of an intra-prediction process, in accordance with one or more techniques of the present disclosure.

FIG. 6 illustrates an example of an intra-prediction process in accordance with one or more techniques of the present disclosure. As illustrated in FIG. 6, prediction unit (PU) 0 602 of picture 600 may have neighboring blocks 604A-604D (collectively, "neighboring blocks 604").

As discussed above, block vector candidates may be selected from spatial neighboring blocks. For example, the spatial neighboring blocks may be those with relative positions as used for AMVP and may be coded with Intra BC. In another example, the used spatial neighboring blocks may include a subset of the spatial neighboring blocks, such as, for example, a left group (that may include left neighboring block 604A (0) and/or left neighboring block 604B (1)) toward the left-side of PU0, or an above group (that may include above neighboring block 604C (2) and/or above neighboring block 604D (3)) toward the top of PU0. It is noted that the blocks shown in FIG. 6 may or may not be aligned with the spatial neighboring blocks used for AMVP.

Figure 7:
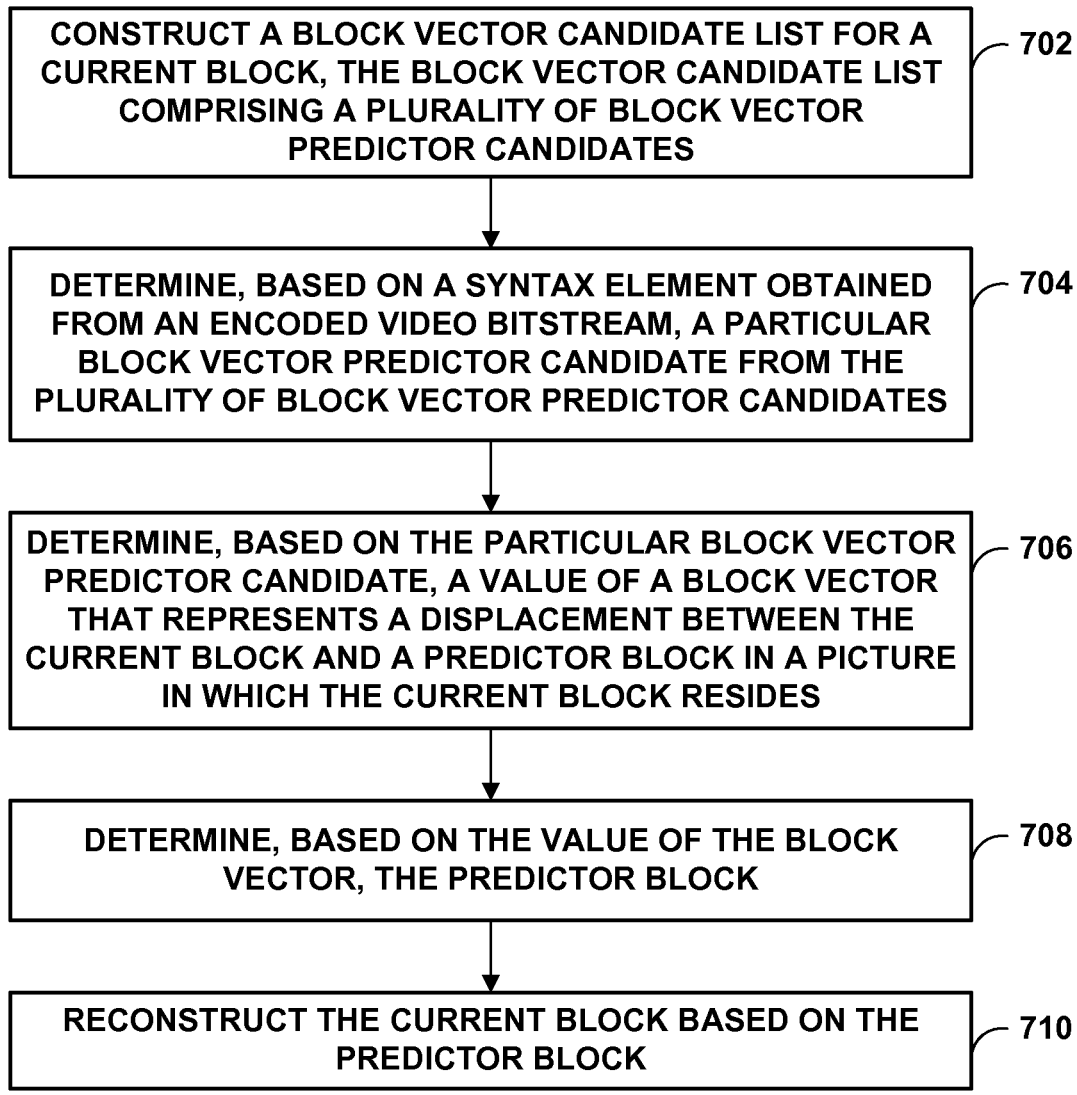
FIG. 7 is a flow diagram illustrating example operations of a video decoder to decode a block vector that identifies a predictor block for a current block, in accordance with one or more techniques of the present disclosure.

FIG. 7 is a flow diagram illustrating example operations of a video decoder to decode a block vector that identifies a predictor block for a current block, in accordance with one or more techniques of the present disclosure. The techniques of FIG. 7 may be performed by one or more video decoders, such as video decoder 30 illustrated in FIGS. 1 and 3. For purposes of illustration, the techniques of FIG. 7 are described within the context of video decoder 30, although video decoders having configurations different than that of video decoder 30 may perform the techniques of FIG. 7.

In accordance with one or more techniques of this disclosure, video decoder 30 may construct a block vector candidate list for a current block of video data (e.g., current block 102 of FIG. 5), the block vector candidate list comprising a plurality of block vector candidates (702). In some examples, each respective block vector predictor candidate of the plurality of block vector predictor candidates may be one of: a block vector of a neighboring block, a block vector of a previously coded block, and a default block vector. In some examples, video decoder 30 may construct the block vector candidate list such that at least one block vector predictor candidate in the plurality of block vector predictor candidates is a default block vector, and the default block vector is a predefined block vector. In some examples, video decoder 30 may construct the block vector candidate list in accordance with the techniques of FIG. 9, below.

Video decoder 30 may determine, based on a syntax element obtained from an encoded video bitstream, a particular block vector predictor candidate from the plurality of block vector predictor candidates (704). For instance, video decoder 30 may select the particular block vector predictor candidate based on a syntax element that indicates which candidate block vector predictor of a plurality of block vector predictors is used to determine the block vector for the current block.

Video decoder 30 may determine, based on the particular block vector predictor candidate, a value of a block vector (e.g., block vector 106 of FIG. 5) that represents a displacement between the current block of video data and a predictor block of video data (e.g., predictor block 104 of FIG. 5) in a picture in which the current block resides (706). For instance, video decoder 30 may determine the value of the block vector by adding the selected particular block vector predictor to a difference between the value of the block vector and the selected particular block vector predictor of the plurality of block vector predictors indicated by the one or more syntax elements of the plurality of syntax elements. In some examples, video decoder 30 may determine the difference based on a plurality of syntax elements obtained from the bitstream. For instance, video decoder 30 may decode a first syntax element of the plurality of syntax elements that indicates whether or not an absolute value of the difference is non-zero, decode a second syntax element of the plurality of syntax elements that indicates the absolute value of the difference minus an offset, and decode a third syntax element that indicates whether the difference is positive or negative.

Video decoder 30 may determine, based on the value of the block vector, the predictor block of video data (708), and reconstruct the current block based on the predictor block (710). For instance, video decoder 30 may generate pixel values for the current block based on a residual block that represents pixel differences between the predictor block and the current block. In some examples, video decoder 30 may obtain an indication of the residual block from the encoded bitstream. In this way, video decoder 30 may decode the current block using Intra BC.

Figure 8:
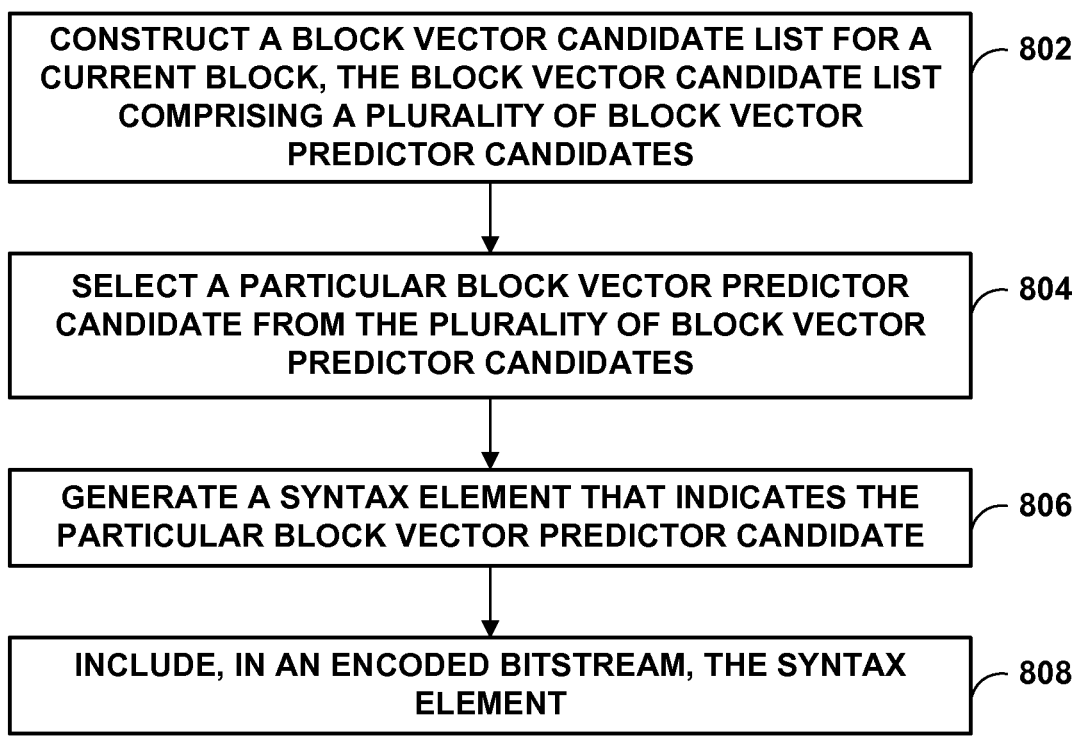
FIG. 8 is a flow diagram illustrating example operations of a video encoder to encode a block vector that identifies a predictor block for a current block, in accordance with one or more techniques of the present disclosure.

FIG. 8 is a flow diagram illustrating example operations of a video encoder to encode a block vector that identifies a predictor block for a current block, in accordance with one or more techniques of the present disclosure. The techniques of FIG. 8 may be performed by one or more video encoders, such as video encoder 20 illustrated in FIGS. 1 and 2. For purposes of illustration, the techniques of FIG. 8 are described within the context of video encoder 20, although video encoders having configurations different than that of video encoder 20 may perform the techniques of FIG. 8.

In accordance with one or more techniques of this disclosure, video encoder 20 may construct a block vector candidate list for a current block of video data (e.g., current block 102 of FIG. 5), the block vector candidate list comprising a plurality of block vector candidates (802). In some examples, each respective block vector predictor candidate of the plurality of block vector predictor candidates may be one of: a block vector of a neighboring block, a block vector of a previously coded block, and a default block vector. In some examples, video encoder 20 may construct the block vector candidate list such that at least one block vector predictor candidate in the plurality of block vector predictor candidates is a default block vector, and the default block vector is a predefined block vector. In some examples, video encoder 20 may construct the block vector candidate list in accordance with the techniques of FIG. 9, below.

Video encoder 20 may select a particular block vector predictor candidate from the plurality of block vector candidates (804). For instance, video encoder 20 may select the particular block vector predictor candidate as the block vector predictor candidate from the plurality of block vector predictor candidates that is the best match to a block vector (e.g., block vector 106 of FIG. 5) for the current block, where the block vector represents a displacement between the current block of video data and a predictor block of video data (e.g., predictor block 104 of FIG. 5) in a picture in which the current block resides. As one example, video encoder 20 may determine which block vector predictor candidate from the plurality of block vector predictor candidates has a value closest to a value of the block vector for the current block.

Video encoder 20 may generate a syntax element that indicates the particular block vector predictor candidate (806). In some examples, video encoder 20 may also generate a plurality of syntax elements that indicate a difference between the value of the block vector for the current block and the value of the particular block vector predictor candidate. For instance, video encoder 20 may generate a first syntax element of the plurality of syntax elements that indicates whether or not an absolute value of the difference is non-zero, generating a second syntax element of the plurality of syntax elements that indicates the absolute value of the difference minus an offset, and generating a third syntax element that indicates whether the difference is positive or negative.

Video encoder 20 may include, in an encoded video bitstream, the of syntax element (812). In some examples, video encoder 20 may also include, in the encoded video bitstream, a residual block that represents pixel differences between the predictor block and the current block. In this way, video encoder 20 may encode the current block using Intra BC.

Figure 9:
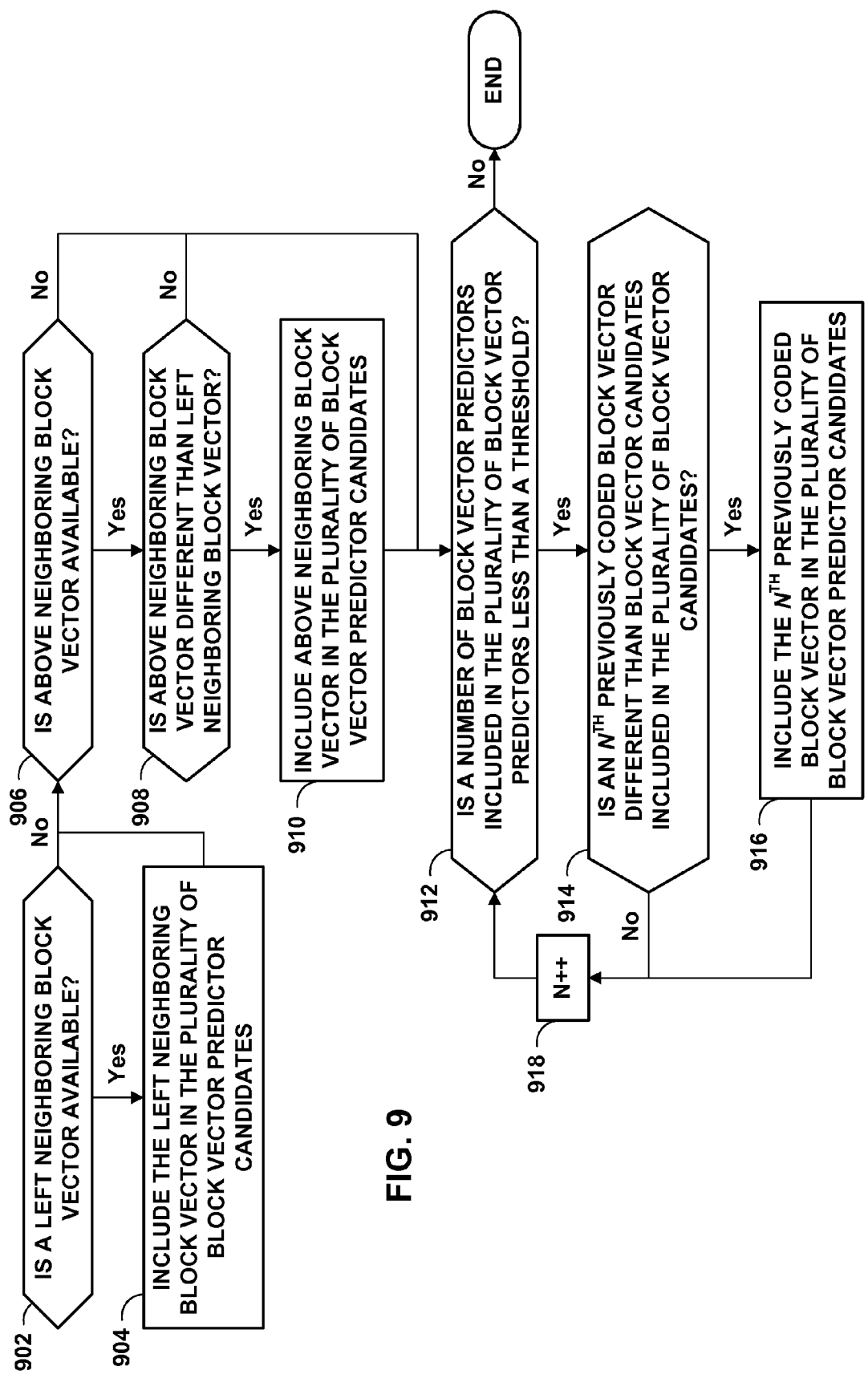
FIG. 9 is a flow diagram illustrating example operations of a video coder to determine a plurality of block vector predictor candidates for a current block, in accordance with one or more techniques of the present disclosure.

FIG. 9 is a flow diagram illustrating example operations of a video coder to determine a plurality of block vector predictor candidates for a current block, in accordance with one or more techniques of the present disclosure. The techniques of FIG. 9 may be performed by one or more video coders, such as video encoder 20 illustrated in FIGS. 1 and 2 or video decoder 30 illustrated in FIGS. 1 and 3. For purposes of illustration, the techniques of FIG. 9 are described within the context of video encoder 20 and video decoder 30, although video coders having configurations different than that of video encoder 20 and video decoder 30 may perform the techniques of FIG. 9.

In accordance with one or more techniques of this disclosure, to generate a plurality of block vector predictor candidates for a current block (e.g., PU0 602 of FIG. 6), a video coder (e.g., video encoder 20 or video decoder 30) may determine whether a left neighboring block vector (e.g., a block vector of left neighboring block 604A or 604B of FIG. 6) is available (902). In some examples, the video coder may initialize the plurality of block vector predictor candidates for the current block (i.e., such that the plurality of block vector predictor candidates for the current block does not include any block vector predictor candidates). Additionally, in some examples, when generating block vector predictor candidates for a new CTU (i.e., where the current block is the first block in the CTU to be coded using Intra BC) the video coder may initialize a plurality of previously coded block vectors. For instance, the video coder may initialize a first previously coded block vector to (−2w, 0) and a second previously coded block vector to (−w, 0).

If the left neighboring block vector is available ("Yes" branch of 902), the video coder may include the left neighboring block vector in the plurality of block vector predictor candidates (904). If the left neighboring block vector is not available ("No" branch of 902), the video coder may determine whether an above neighboring block vector (e.g., a block vector of left neighboring block 604C or 604D of FIG. 6) is available (906). The video coder may determine whether the above neighboring block vector is different than the left neighboring block vector (908). If the above neighboring block vector is available ("Yes" branch of 906) and if the above neighboring block vector is different than the left neighboring block vector ("Yes" branch of 908), the video coder may include the above neighboring block vector in the plurality of block vector predictor candidates (910) and determine whether a number of block vector predictors included in the plurality of block vector predictors is less than a threshold (912). If the above neighboring block vector is not available ("No" branch of 906) or if the above neighboring block vector is not different than the left neighboring block vector ("No" branch of 908), the video coder may determine whether a number of block vector predictors included in the plurality of block vector predictors is less than a threshold (912). In this way, the video coder may evaluate neighboring block vectors for inclusion in the plurality of block vector predictors.

If the number of block vector predictors included in the plurality of block vector predictors is not less than the threshold ("No" branch of 912), the video coder may complete determining the plurality of block vector predictors for the current block. If the number of block vector predictors included in the plurality of block vector predictors is less than the threshold ("Yes" branch of 912), the video coder may determine whether an $N^{th}$ previously coded block vector is different than block vector predictor candidates included in the plurality of block vector candidates (914). If the $N^{th}$ previously coded block vector is different than block vector predictor candidates included in the plurality of block vector candidates ("Yes" branch of 914), the video coder may include the $N^{th}$ previously coded block vector in the plurality of block vector predictor candidates (916), increment N (918), and determine whether a number of block vector predictors included in the plurality of block vector predictors is less than a threshold (912). If the $N^{th}$ previously coded block vector is not different than (i.e., is the same as) a block vector predictor candidate included in the plurality of block vector candidates ("No" branch of 914), the video coder increments N (918), and determines whether a number of block vector predictors included in the plurality of block vector predictors is less than a threshold (912). In this way, the video coder may evaluate previously coded block vectors for inclusion in the plurality of block vector predictors.

As discussed above, in some examples, when generating block vector predictor candidates for a block in a new CTU, the video coder may initialize a first previously coded block vector to (−2w, 0) and a second previously coded block vector to (−w, 0). As such, when determining a plurality of block vector predictor candidates for a first block in a CTU to be coded using Intra BC, the first previously coded block vector evaluated by the video coder (i.e., in 914) may be (−2w, 0) and, if needed, the second previously coded block vector evaluated by the video coder may be (−w, 0). Similarly, when determining a plurality of block vector predictor candidates for a second block in a CTU to be coded using Intra BC, the first previously coded block vector evaluated by the video coder (i.e., in 914) may be the block vector of the first block in the CTU coded using Intra BC and, if needed, the second previously coded block vector evaluated by the video coder may be (−2w, 0). In this way, the video coder may evaluate default block vectors for inclusion in the plurality of block vector predictors.

The following examples may illustrate one or more aspects of the disclosure:

Example 1

A method for decoding video data using Intra Block Copy (BC), the method comprising: constructing a block vector candidate list for a current block of the video data, the block vector candidate list comprising a plurality of block vector predictor candidates, wherein each respective block vector predictor candidate of the plurality of block vector predictor candidates is one of: a block vector of a neighboring block, a block vector of a previously coded block, and a default block vector, wherein at least one block vector predictor candidate in the plurality of block vector predictor candidates is a default block vector, wherein the default block vector is a predefined block vector; determining, based on a syntax element obtained from an encoded video bitstream, a particular block vector predictor candidate from the plurality of block vector predictor candidates; determining, based on the particular block vector predictor candidate, a value of a block vector that represents a displacement between the current block of video data and a predictor block of video data in a picture in which the current block resides; determining, based on the value the block vector, the predictor block of video data; and reconstructing the current block based on the predictor block.

Example 2

The method of example 1, wherein constructing the block vector candidate list for the current block further comprises: including, based on a left neighboring block of the current block including a block vector that is available for use as a block vector predictor candidate for the current block, the block vector of the left neighboring block in the block vector candidate list for the current block; and including, based on an above neighboring block of the current block including a block vector that is available for use as a block vector predictor candidate for the current block, the block vector of the above neighboring block in the block vector candidate list for the current block.

Example 3

The method of any combination of examples 1-2, wherein constructing the block vector candidate list for the current block further comprises: determining, based on one or both of the left neighboring block of the current block or the above neighboring block of the current block not including a block vector that is available for use as a block vector predictor candidate for the current block, whether to include a block vector of a previously decoded block in the block vector candidate list for the current block based on whether the block vector of the previously decoded block is available for use as a block vector predictor candidate for the current block; responsive to determining that the block vector of the previously decoded block is available for use as a block vector predictor candidate for the current block, including the block vector of the previously decoded block in the block vector candidate list for the current block.

Example 4

The method of any combination of examples 1-3, wherein the block vector of the previously decoded block is not available for use as a block vector predictor candidate for the current block where the current block is the first block in a coding tree unit (CTU) to be decoded using Intra BC.

Example 5

The method of any combination of examples 1-4, wherein the block vector of the previously decoded block is a block vector of a first previously decoded block, and wherein constructing the block vector candidate list for the current block for the current block further comprises: determining, based on including the block vector of the first previously decoded block in the block vector candidate list for the current block, whether the block vector candidate list for the current block includes a number of block vector predictor candidates that is less than a threshold; responsive to determining that the block vector candidate list for the current block includes a number of block vector predictor candidates that is less than the threshold, determining whether to include a block vector of a second previously decoded block in the block vector candidate list for the current block based on whether the block vector of the second previously decoded block is available for use as a block vector predictor candidate for the current block; and responsive to determining that the block vector of the second previously decoded block is available for use as a block vector predictor candidate for the current block, including the block vector of the second previously decoded block in the block vector candidate list for the current block.

Example 6

The method of any combination of examples 1-5, wherein the block vector of the second previously decoded block is not available for use as a block vector predictor candidate for the current block where the current block is the second block in a coding tree unit (CTU) to be decoded using Intra BC.

Example 7

The method of any combination of examples 1-6, wherein constructing the block vector candidate list for the current block further comprises: determining, based on including the block vector of the second previously decoded block in the block vector candidate list for the current block, whether the block vector candidate list for the current block includes a number of block vector predictor candidates that is less than the threshold; and responsive to determining that the block vector candidate list for the current block includes a number of block vector predictor candidates that is less than the threshold, including a default block vector in the block vector candidate list for the current block.

Example 8

The method of any combination of examples 1-7, wherein the default block vector is a first default block vector, and wherein constructing the block vector candidate list for the current block further comprises: determining, based on including the first default block vector in the block vector candidate list for the current block, whether the block vector candidate list for the current block includes a number of block vector predictor candidates that is less than the threshold; and responsive to determining that the block vector candidate list for the current block includes a number of block vector predictor candidates that is less than the threshold, including a second default block vector in the block vector candidate list for the current block.

Example 9

The method of any combination of examples 1-8, wherein the first default block vector is (−2w, 0), wherein the second default block vector is (−w, 0), wherein w corresponds to the width of the current block.

Example 10

The method of any combination of examples 1-9, wherein the threshold is two.

Example 11

The method of any combination of examples 1-10, further comprising: determining that a block vector is not available for use as a block vector predictor candidate for the current block where the block vector is the same a block vector predictor candidate already included in the block vector candidate list for the current block.

Example 12

The method of any combination of examples 1-11, further comprising: determining, based on one or more syntax elements obtained from the encoded video bitstream, a difference between a value of the particular block vector predictor candidate and the value of the block vector.

Example 13

A method for encoding video data using Intra Block Copy (BC), the method comprising: constructing a block vector candidate list for a current block of the video data, the block vector candidate list comprising a plurality of block vector predictor candidates, wherein each respective block vector predictor candidate of the plurality of block vector predictor candidates is one of: a block vector of a neighboring block, a block vector of a previously coded block, and a default block vector, wherein at least one block vector predictor candidate in the plurality of block vector predictor candidates is a default block vector, wherein the default block vector is a predefined block vector; selecting a particular block vector predictor candidate from the plurality of block vector predictor candidates; generating a syntax element that indicates the particular block vector predictor candidate; and including, in an encoded video bitstream, the syntax element.

Example 14

The method of example 13, wherein constructing the block vector candidate list for the current block further comprises: including, based on a left neighboring block of the current block including a block vector that is available for use as a block vector predictor candidate for the current block, the block vector of the left neighboring block in the block vector candidate list for the current block; and including, based on an above neighboring block of the current block including a block vector that is available for use as a block vector predictor candidate for the current block, the block vector of the above neighboring block in the block vector candidate list for the current block.

Example 15

The method of any combination of examples 13-14, wherein constructing the block vector candidate list for the current block further comprises: determining, based on one or both of the left neighboring block of the current block or the above neighboring block of the current block not including a block vector that is available for use as a block vector predictor candidate for the current block, whether to include a block vector of a previously decoded block in the block vector candidate list for the current block based on whether the block vector of the previously decoded block is available for use as a block vector predictor candidate for the current block; responsive to determining that the block vector of the previously decoded block is available for use as a block vector predictor candidate for the current block, including the block vector of the previously decoded block in the block vector candidate list for the current block.

Example 16

The method of any combination of examples 13-15, wherein the block vector of the previously decoded block is not available for use as a block vector predictor candidate for the current block where the current block is the first block in a coding tree unit (CTU) to be decoded using Intra BC.

Example 17

The method of any combination of examples 13-16, wherein the block vector of the previously decoded block is a block vector of a first previously decoded block, and wherein constructing the block vector candidate list for the current block for the current block further comprises: determining, based on including the block vector of the first previously decoded block in the block vector candidate list for the current block, whether the block vector candidate list for the current block includes a number of block vector predictor candidates that is less than a threshold; responsive to determining that the block vector candidate list for the current block includes a number of block vector predictor candidates that is less than the threshold, determining whether to include a block vector of a second previously decoded block in the block vector candidate list for the current block based on whether the block vector of the second previously decoded block is available for use as a block vector predictor candidate for the current block; and responsive to determining that the block vector of the second previously decoded block is available for use as a block vector predictor candidate for the current block, including the block vector of the second previously decoded block in the block vector candidate list for the current block.

Example 18

The method of any combination of examples 13-17, wherein the block vector of the second previously decoded block is not available for use as a block vector predictor candidate for the current block where the current block is the second block in a coding tree unit (CTU) to be decoded using Intra BC.

Example 19

The method of any combination of examples 13-18, wherein constructing the block vector candidate list for the current block further comprises: determining, based on including the block vector of the second previously decoded block in the block vector candidate list for the current block, whether the block vector candidate list for the current block includes a number of block vector predictor candidates that is less than the threshold; and responsive to determining that the block vector candidate list for the current block includes a number of block vector predictor candidates that is less than the threshold, including a default block vector in the block vector candidate list for the current block.

Example 20

The method of any combination of examples 13-19, wherein the default block vector is a first default block vector, and wherein constructing the block vector candidate list for the current block further comprises: determining, based on including the first default block vector in the block vector candidate list for the current block, whether the block vector candidate list for the current block includes a number of block vector predictor candidates that is less than the threshold; and responsive to determining that the block vector candidate list for the current block includes a number of block vector predictor candidates that is less than the threshold, including a second default block vector in the block vector candidate list for the current block.

Example 21

The method of any combination of examples 13-20, wherein the first default block vector is (−2w,0), wherein the second default block vector is (−w,0), wherein w corresponds to the width of the current block.

Example 22

The method of any combination of examples 13-21, wherein the threshold is two.

Example 23

The method of any combination of examples 13-22, further comprising: determining that a block vector is not available for use as a block vector predictor candidate for the current block where the block vector is the same a block vector predictor candidate already included in the block vector candidate list for the current block.

Example 24

The method of any combination of examples 13-23, further comprising: determining, based on one or more syntax elements obtained from the encoded video bitstream, a difference between a value of the particular block vector predictor candidate and the value of the block vector.

Example 25

A device for decoding video data, the device comprising: a memory configured to store data associated with a current block of video data; and one or more processors configured to perform the method of any combination of examples 1-12.

Example 26

A device for encoding video data, the device comprising: a memory configured to store data associated with a current block of video data; and one or more processors configured to perform the method of any combination of examples 13-24.

Example 27

A device for decoding video data using Intra Block Copy (BC), the device comprising means for performing the method of any combination of examples 1-12.

Example 28

A device for encoding video data using Intra Block Copy (BC), the device comprising means for performing the method of any combination of examples 13-24.

Example 29

A computer-readable storage medium storing instructions that, when executed, cause one or more processors of a device to decode video data using Intra Block Copy (BC) by at least causing the one or more processors to perform the method of any combination of examples 1-12.

Example 30

A computer-readable storage medium storing instructions that, when executed, cause one or more processors of a device to encode video data using Intra Block Copy (BC) by at least causing the one or more processors to perform the method of any combination of examples 13-24.

Example 31

An apparatus for motion prediction, the apparatus comprising: a memory unit configured to store at least one coding unit (CU) for a picture; and a processor operationally coupled to the memory unit and configured to identify a prediction unit (PU) of the at least one CU for Intra Block Copy (BC), construct a block vector candidate list for the PU, and select ones of the block vector predictor candidates in the list for the Intra BC based on whether the candidates are based on spatial neighboring blocks, previously decoded CUs or PUs, or default block vectors.

Example 32

An apparatus for motion prediction, the apparatus comprising: a memory unit configured to store at least one coding unit (CU) for a picture; and a processor operationally coupled to the memory unit and configured to identify a prediction unit (PU) of the at least one CU for Intra Block Copy (BC), construct a block vector candidate list for the PU, and remove a block vector predictor candidate from inclusion in the list for the Intra BC, in response to the candidate belonging to a block within a same CU as the current block.

Example 33

An apparatus for motion prediction, the apparatus comprising: a memory unit configured to store at least one coding unit (CU) for a picture; and a processor operationally coupled to the memory unit and configured to identify a prediction unit (PU) of the at least one CU for Intra Block Copy (BC), construct a block vector candidate list for the PU, and identify a merge candidate, from the candidate list, that is merged with a co-located block, in response to both temporal motion vector prediction (TMVP) and Intra BC being activated; wherein the merge candidate from the TMVP is an Intra BC candidate when the co-located block is coded with the Intra BC; and wherein the merge candidate from the TMVP is an inter-prediction candidate when the co-located block is coded with normal inter-prediction.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for decoding video data using Intra Block Copy (BC), the method comprising:
constructing a block vector candidate list for a current block of the video data, the block vector candidate list comprising a plurality of block vector predictor candidates, wherein each respective block vector predictor candidate of the plurality of block vector predictor candidates is one of: a block vector of a neighboring block, a block vector of a previously coded block, and a predefined default block vector, wherein at least one block vector predictor candidate in the plurality of block vector predictor candidates included in the constructed block vector candidate list is a default block vector, wherein constructing the block vector candidate list for the current block further comprises:

including, based on a left neighboring block of the current block including a block vector that is available for use as a block vector predictor candidate for the current block, the block vector of the left neighboring block in the block vector candidate list for the current block;

responsive to determining that the left neighboring block of the current block does not include a block vector that is available for use as a block vector predictor candidate for the current block or that the block vector of the left neighboring block is the same as the predefined default block vector, including, based on an above neighboring block of the current block including a block vector that is available for use as a block vector predictor candidate for the current block, the block vector of the above neighboring block in the block vector candidate list for the current block;

determining, based on one or both of the left neighboring block of the current block or the above neighboring block of the current block not including a block vector that is available for use as a block vector predictor candidate for the current block, whether to include a block vector of a first previously decoded block in the block vector candidate list for the current block based on whether the block vector of the first previously decoded block is available for use as a block vector predictor candidate for the current block;

responsive to determining that the block vector of the first previously decoded block is available for use as a block vector predictor candidate for the current block, including the block vector of the first previously decoded block in the block vector candidate list for the current block;

determining, based on including the block vector of the first previously decoded block in the block vector candidate list for the current block, whether the block vector candidate list for the current block includes a number of block vector predictor candidates that is less than a threshold, wherein the threshold is two;

responsive to determining that the block vector candidate list for the current block includes a number of block vector predictor candidates that is less than the threshold, determining whether to include a block vector of a second previously decoded block in the block vector candidate list for the current block based on whether the block vector of the second previously decoded block is available for use as a block vector predictor candidate for the current block;

responsive to determining that the block vector of the second previously decoded block is available for use as a block vector predictor candidate for the current block, including the block vector of the second previously decoded block in the block vector candidate list for the current block;

determining, based on including the block vector of the second previously decoded block in the block vector candidate list for the current block, whether the block vector candidate list for the current block includes a number of block vector predictor candidates that is less than the threshold;

responsive to determining that the block vector candidate list for the current block includes a number of block vector predictor candidates that is less than the threshold, including a first predefined default block vector in the block vector candidate list for the current block;

determining, based on including the first predefined default block vector in the block vector candidate list for the current block, whether the block vector candidate list for the current block includes a number of block vector predictor candidates that is less than the threshold;

responsive to determining that the block vector candidate list for the current block includes a number of block vector predictor candidates that is less than the threshold, including a second predefined default block vector in the block vector candidate list for the current block; and determining that a block vector is not available for use as a block vector predictor candidate for the current block where the block vector is identical to a block vector predictor candidate already included in the block vector candidate list for the current block;

selecting, based on a syntax element obtained from an encoded video bitstream, a particular block vector predictor candidate from the plurality of block vector predictor candidates;

determining, based on the particular block vector predictor candidate, a value of a block vector that represents a displacement between the current block of video data and a predictor block of video data in a picture in which the current block resides;

determining, based on the value the block vector, the predictor block of video data; and reconstructing the current block based on the predictor block.

2. The method of claim 1, wherein the block vector of the previously decoded block is not available for use as a block vector predictor candidate for the current block where the current block is the first block in a coding tree unit (CTU) to be decoded using Intra BC.

3. The method of claim 1, wherein the block vector of the second previously decoded block is not available for use as a block vector predictor candidate for the current block where the current block is the second block in a coding tree unit (CTU) to be decoded using Intra BC.

4. The method of claim 1, wherein the first default block vector is (−2w,0), wherein the second default block vector is (−w,0), wherein w corresponds to a width of the current block or a width of a coding unit that includes the current block.

5. The method of claim 1, further comprising:
determining, based on one or more syntax elements obtained from the encoded video bitstream, a difference between a value of the particular block vector predictor candidate and the value of the block vector.

6. A method for encoding video data using Intra Block Copy (BC), the method comprising:
constructing a block vector candidate list for a current block of the video data, the block vector candidate list comprising a plurality of block vector predictor candidates, wherein each respective block vector predictor candidate of the plurality of block vector predictor candidates is one of: a block vector of a neighboring block, a block vector of a previously coded block, and a predefined default block vector, wherein at least one block vector predictor candidate in the plurality of block vector predictor candidates included in the constructed block vector candidate list is a default block vector, wherein constructing the block vector candidate list for the current block further comprises:

including, based on a left neighboring block of the current block including a block vector that is available for use as a block vector predictor candidate for the current block, the block vector of the left neighboring block in the block vector candidate list for the current block;

responsive to determining that the left neighboring block of the current block does not include a block vector that is available for use as a block vector predictor candidate for the current block or that the block vector of the left neighboring block is the same as the predefined default block vector, including, based on an above neighboring block of the current block including a block vector that is available for use as a block vector predictor candidate for the current block, the block vector of the above neighboring block in the block vector candidate list for the current block;

determining, based on one or both of the left neighboring block of the current block or the above neighboring block of the current block not including a block vector that is available for use as a block vector predictor candidate for the current block, whether to include a block vector of a first previously decoded block in the block vector candidate list for the current block based on whether the block vector of the first previously decoded block is available for use as a block vector predictor candidate for the current block;

responsive to determining that the block vector of the first previously decoded block is available for use as a block vector predictor candidate for the current block, including the block vector of the first previously decoded block in the block vector candidate list for the current block;

determining, based on including the block vector of the first previously decoded block in the block vector candidate list for the current block, whether the block vector candidate list for the current block includes a number of block vector predictor candidates that is less than a threshold, wherein the threshold is two;

responsive to determining that the block vector candidate list for the current block includes a number of block vector predictor candidates that is less than the threshold, determining whether to include a block vector of a second previously decoded block in the block vector candidate list for the current block based on whether the block vector of the second previously decoded block is available for use as a block vector predictor candidate for the current block;

responsive to determining that the block vector of the second previously decoded block is available for use as a block vector predictor candidate for the current block, including the block vector of the second previously decoded block in the block vector candidate list for the current block;

determining, based on including the block vector of the second previously decoded block in the block vector candidate list for the current block, whether the block vector candidate list for the current block includes a number of block vector predictor candidates that is less than the threshold;

responsive to determining that the block vector candidate list for the current block includes a number of block vector predictor candidates that is less than the threshold, including a first predefined default block vector in the block vector candidate list for the current block;

determining, based on including the first predefined default block vector in the block vector candidate list for the current block, whether the block vector candidate list for the current block includes a number of block vector predictor candidates that is less than the threshold;

responsive to determining that the block vector candidate list for the current block includes a number of block vector predictor candidates that is less than the threshold, including a second predefined default block vector in the block vector candidate list for the current block; and determining that a block vector is not available for use as a block vector predictor candidate for the current block where the block vector is identical to a block vector predictor candidate already included in the block vector candidate list for the current block;

selecting a particular block vector predictor candidate from the plurality of block vector predictor candidates;

generating a syntax element that indicates the particular block vector predictor candidate; and including, in an encoded video bitstream, the syntax element.

7. The method of claim 6, wherein the block vector of the previously decoded block is not available for use as a block vector predictor candidate for the current block where the current block is the first block in a coding tree unit (CTU) to be decoded using Intra BC.

8. The method of claim 6, wherein the block vector of the second previously decoded block is not available for use as a block vector predictor candidate for the current block where the current block is the second block in a coding tree unit (CTU) to be decoded using Intra BC.

9. The method of claim 6, wherein the first default block vector is (−2w,0), wherein the second default block vector is (−w,0), wherein w corresponds to a width of the current block or a width of a coding unit that includes the current block.

10. The method of claim 6, further comprising:
determining, based on one or more syntax elements obtained from the encoded video bitstream, a difference between a value of the particular block vector predictor candidate and the value of the block vector.

11. A device for decoding video data, the device comprising:
a memory configured to store data associated with a current block of video data; and
one or more processors configured to:
construct a block vector candidate list for a current block of the video data, the block vector candidate list comprising a plurality of block vector predictor candidates, wherein each respective block vector predictor candidate of the plurality of block vector predictor candidates is one of: a block vector of a neighboring block, a block vector of a previously coded block, and a predefined default block vector, wherein at least one block vector predictor candidate in the plurality of block vector predictor candidates included in the constructed block vector candidate list is a default block vector, wherein, to construct the block vector candidate list for the current block, the one or more processors are configured to:

include, based on a left neighboring block of the current block including a block vector that is available for use as a block vector predictor candidate for the current block, the block vector of the left neighboring block in the block vector candidate list for the current block;

responsive to determining that the left neighboring block of the current block does not include a block vector that is available for use as a block vector predictor candidate for the current block or that the block vector of the left neighboring block is the same as the predefined default block vector, include, based on an above neighboring block of the current block including a block vector that is available for use as a block vector predictor candidate for the current block, the block vector of the above neighboring block in the block vector candidate list for the current block;

determine, based on one or both of the left neighboring block of the current block or the above neighboring block of the current block not including a block vector that is available for use as a block vector predictor candidate for the current block, whether to include a block vector of a first previously decoded block in the block vector candidate list for the current block based on whether the block vector of the first previously decoded block is available for use as a block vector predictor candidate for the current block;

responsive to determining that the block vector of the first previously decoded block is available for use as a block vector predictor candidate for the current block, include the block vector of the first previously decoded block in the block vector candidate list for the current block;

determine, based on including the block vector of the first previously decoded block in the block vector candidate list for the current block, whether the block vector candidate list for the current block includes a number of block vector predictor candidates that is less than a threshold, wherein the threshold is two;

responsive to determining that the block vector candidate list for the current block includes a number of block vector predictor candidates that is less than the threshold, determine whether to include a block vector of a second previously decoded block in the block vector candidate list for the current block based on whether the block vector of the second previously decoded block is available for use as a block vector predictor candidate for the current block;

responsive to determining that the block vector of the second previously decoded block is available for use as a block vector predictor candidate for the current block, include the block vector of the second previously decoded block in the block vector candidate list for the current block;

determine, based on including the block vector of the second previously decoded block in the block vector candidate list for the current block, whether the block vector candidate list for the current block includes a number of block vector predictor candidates that is less than the threshold;

responsive to determining that the block vector candidate list for the current block includes a number of block vector predictor candidates that is less than the threshold, include a first predefined default block vector in the block vector candidate list for the current block;

determine, based on including the first predefined default block vector in the block vector candidate list for the current block, whether the block vector candidate list for the current block includes a number of block vector predictor candidates that is less than the threshold;

responsive to determining that the block vector candidate list for the current block includes a number of block vector predictor candidates that is less than the threshold, include a second predefined default block vector in the block vector candidate list for the current block; and determine that a block vector is not available for use as a block vector predictor candidate for the current block where the block vector is identical to a block vector predictor candidate already included in the block vector candidate list for the current block;

determine, based on a syntax element obtained from an encoded video bitstream, a particular block vector predictor candidate from the plurality of block vector predictor candidates;

determine, based on the particular block vector predictor candidate, a value of a block vector that represents a displacement between the current block of video data and a predictor block of video data in a picture in which the current block resides;

determine, based on the value the block vector, the predictor block of video data; and reconstruct the current block based on the predictor block.

12. The device of claim 11, wherein the block vector of the previously decoded block is not available for use as a block vector predictor candidate for the current block where the current block is the first block in a coding tree unit (CTU) to be decoded using Intra BC.

13. The device of claim 11, wherein the block vector of the second previously decoded block is not available for use as a block vector predictor candidate for the current block where the current block is the second block in a coding tree unit (CTU) to be decoded using Intra BC.

14. The device of claim 11, wherein the first default block vector is (−2w,0), wherein the second default block vector is (−w,0), wherein w corresponds to a width of the current block or a width of a coding unit that includes the current block.

15. The device of claim 11, wherein the one or more processors are configured to:

determine, based on one or more syntax elements obtained from the encoded video bitstream, a difference between a value of the particular block vector predictor candidate and the value of the block vector.

16. A device for encoding video data, the device comprising:

a memory configured to store data associated with a current block of video data; and one or more processors configured to:
construct a block vector candidate list for a current block of the video data, the block vector candidate list comprising a plurality of block vector predictor candidates, wherein each respective block vector predictor candidate of the plurality of block vector predictor candidates is one of: a block vector of a neighboring block, a block vector of a previously coded block, and a predefined default block vector, wherein at least one block vector predictor candidate in the plurality of block vector predictor candidates included in the constructed block vector candidate list is a default block vector, wherein, to construct the block vector candidate list for the current block, the one or more processors are configured to:
include, based on a left neighboring block of the current block including a block vector that is available for use as a block vector predictor candidate for the current block, the block vector of the left neighboring block in the block vector candidate list for the current block;
responsive to determining that the left neighboring block of the current block does not include a block vector that is available for use as a block vector predictor candidate for the current block or that the block vector of the left neighboring block is the same as the predefined default block vector, include, based on an above neighboring block of the current block including a block vector that is available for use as a block vector predictor candidate for the current block, the block vector of the above neighboring block in the block vector candidate list for the current block;
determine, based on one or both of the left neighboring block of the current block or the above neighboring block of the current block not including a block vector that is available for use as a block vector predictor candidate for the current block, whether to include a block vector of a first previously decoded block in the block vector candidate list for the current block based on whether the block vector of the first previously decoded block is available for use as a block vector predictor candidate for the current block;
responsive to determining that the block vector of the first previously decoded block is available for use as a block vector predictor candidate for the current block, include the block vector of the first previously decoded block in the block vector candidate list for the current block;
determine, based on including the block vector of the first previously decoded block in the block vector candidate list for the current block, whether the block vector candidate list for the current block includes a number of block vector predictor candidates that is less than a threshold, wherein the threshold is two;
responsive to determining that the block vector candidate list for the current block includes a number of block vector predictor candidates that is less than the threshold, determine whether to include a block vector of a second previously decoded block in the block vector candidate list for the current block based on whether the block vector of the second previously decoded block is available for use as a block vector predictor candidate for the current block;
responsive to determining that the block vector of the second previously decoded block is available for use as a block vector predictor candidate for the current block, include the block vector of the second previously decoded block in the block vector candidate list for the current block;
determine, based on including the block vector of the second previously decoded block in the block vector candidate list for the current block, whether the block vector candidate list for the current block includes a number of block vector predictor candidates that is less than the threshold;
responsive to determining that the block vector candidate list for the current block includes a number of block vector predictor candidates that is less than the threshold, include a first predefined default block vector in the block vector candidate list for the current block;
determine, based on including the first predefined default block vector in the block vector candidate list for the current block, whether the block vector candidate list for the current block includes a number of block vector predictor candidates that is less than the threshold:
responsive to determining that the block vector candidate list for the current block includes a number of block vector predictor candidates that is less than the threshold, include a second predefined default block vector in the block vector candidate list for the current block; and
determine that a block vector is not available for use as a block vector predictor candidate for the current block where the block vector is identical to a block vector predictor candidate already included in the block vector candidate list for the current block;
select a particular block vector predictor candidate from the plurality of block vector predictor candidates;
generate a syntax element that indicates the particular block vector predictor candidate; and
include, in an encoded video bitstream, the syntax element.

17. The device of claim 16, wherein the block vector of the previously decoded block is not available for use as a block vector predictor candidate for the current block where the current block is the first block in a coding tree unit (CTU) to be decoded using Intra BC.

18. The device of claim 16, wherein the block vector of the second previously decoded block is not available for use as a block vector predictor candidate for the current block where the current block is the second block in a coding tree unit (CTU) to be decoded using Intra BC.

19. The device of claim 16, wherein the first default block vector is (−2w,0), wherein the second default block vector is (−w,0), wherein w corresponds to a width of the current block or a width of a coding unit that includes the current block.

20. The device of claim 16, wherein the one or more processors are configured to:
determine, based on one or more syntax elements obtained from the encoded video bitstream, a difference between a value of the particular block vector predictor candidate and the value of the block vector.

21. A device for decoding video data using Intra Block Copy (BC), the device comprising:
means for constructing a block vector candidate list for a current block of the video data, the block vector candidate list comprising a plurality of block vector predictor candidates, wherein each respective block vector predictor candidate of the plurality of block vector predictor candidates is one of: a block vector of a neighboring block, a block vector of a previously coded block, and a predefined default block vector, wherein at least one block vector predictor candidate in the plurality of block vector predictor candidates included in the constructed block vector candidate list is a default block vector, wherein the means for constructing the block vector candidate list for the current block comprise:

means for including, based on a left neighboring block of the current block including a block vector that is available for use as a block vector predictor candidate for the current block, the block vector of the left neighboring block in the block vector candidate list for the current block;

means for including, responsive to determining that the left neighboring block of the current block does not include a block vector that is available for use as a block vector predictor candidate for the current block or that the block vector of the left neighboring block is the same as the predefined default block vector, based on an above neighboring block of the current block including a block vector that is available for use as a block vector predictor candidate for the current block, the block vector of the above neighboring block in the block vector candidate list for the current block;

means for determining, based on one or both of the left neighboring block of the current block or the above neighboring block of the current block not including a block vector that is available for use as a block vector predictor candidate for the current block, whether to include a block vector of a first previously decoded block in the block vector candidate list for the current block based on whether the block vector of the first previously decoded block is available for use as a block vector predictor candidate for the current block;

means for including, responsive to determining that the block vector of the first previously decoded block is available for use as a block vector predictor candidate for the current block, the block vector of the first previously decoded block in the block vector candidate list for the current block;

means for determining, based on including the block vector of the first previously decoded block in the block vector candidate list for the current block, whether the block vector candidate list for the current block includes a number of block vector predictor candidates that is less than a threshold, wherein the threshold is two;

means for determining, responsive to determining that the block vector candidate list for the current block includes a number of block vector predictor candidates that is less than the threshold, whether to include a block vector of a second previously decoded block in the block vector candidate list for the current block based on whether the block vector of the second previously decoded block is available for use as a block vector predictor candidate for the current block;

means for including, responsive to determining that the block vector of the second previously decoded block is available for use as a block vector predictor candidate for the current block, the block vector of the second previously decoded block in the block vector candidate list for the current block;

means for determining, based on including the block vector of the second previously decoded block in the block vector candidate list for the current block, whether the block vector candidate list for the current block includes a number of block vector predictor candidates that is less than the threshold;

means for including, responsive to determining that the block vector candidate list for the current block includes a number of block vector predictor candidates that is less than the threshold, a first predefined default block vector in the block vector candidate list for the current block;

means for determining, based on including the first predefined default block vector in the block vector candidate list for the current block, whether the block vector candidate list for the current block includes a number of block vector predictor candidates that is less than the threshold;

means for including, responsive to determining that the block vector candidate list for the current block includes a number of block vector predictor candidates that is less than the threshold, a second predefined default block vector in the block vector candidate list for the current block; and means for determining that a block vector is not available for use as a block vector predictor candidate for the current block where the block vector is identical to a block vector predictor candidate already included in the block vector candidate list for the current block;

means for determining, based on a syntax element obtained from an encoded video bitstream, a particular block vector predictor candidate from the plurality of block vector predictor candidates;

means for determining, based on the particular block vector predictor candidate, a value of a block vector that represents a displacement between the current block of video data and a predictor block of video data in a picture in which the current block resides;

means for determining, based on the value the block vector, the predictor block of video data; and means for reconstructing the current block based on the predictor block.

22. A device for encoding video data using Intra Block Copy (BC), the device comprising:

means for constructing a block vector candidate list for a current block of the video data, the block vector candidate list comprising a plurality of block vector predictor candidates, wherein each respective block vector predictor candidate of the plurality of block vector predictor candidates is one of: a block vector of a neighboring block, a block vector of a previously coded block, and a predefined default block vector, wherein at least one block vector predictor candidate in the plurality of block vector predictor candidates included in the constructed block vector candidate list is a default block vector, wherein the means for constructing the block vector candidate list for the current block comprise:

means for including, based on a left neighboring block of the current block including a block vector that is available for use as a block vector predictor candidate for the current block, the block vector of the left neighboring block in the block vector candidate list for the current block;

means for including, responsive to determining that the left neighboring block of the current block does not include a block vector that is available for use as a block vector predictor candidate for the current block or that the block vector of the left neighboring block is the same as the predefined default block vector, based on an above neighboring block of the current block including a block vector that is available for use as a block vector predictor candidate for the current block, the block vector of the above neighboring block in the block vector candidate list for the current block;

means for determining, based on one or both of the left neighboring block of the current block or the above neighboring block of the current block not including a block vector that is available for use as a block vector predictor candidate for the current block, whether to include a block vector of a first previously decoded block in the block vector candidate list for the current block based on whether the block vector of the first previously decoded block is available for use as a block vector predictor candidate for the current block;

means for including, responsive to determining that the block vector of the first previously decoded block is available for use as a block vector predictor candidate for the current block, the block vector of the first previously decoded block in the block vector candidate list for the current block;

means for determining, based on including the block vector of the first previously decoded block in the block vector candidate list for the current block, whether the block vector candidate list for the current block includes a number of block vector predictor candidates that is less than a threshold, wherein the threshold is two;

means for determining, responsive to determining that the block vector candidate list for the current block includes a number of block vector predictor candidates that is less than the threshold, whether to include a block vector of a second previously decoded block in the block vector candidate list for the current block based on whether the block vector of the second previously decoded block is available for use as a block vector predictor candidate for the current block;

means for including, responsive to determining that the block vector of the second previously decoded block is available for use as a block vector predictor candidate for the current block, the block vector of the second previously decoded block in the block vector candidate list for the current block;

means for determining, based on including the block vector of the second previously decoded block in the block vector candidate list for the current block, whether the block vector candidate list for the current block includes a number of block vector predictor candidates that is less than the threshold;

means for including, responsive to determining that the block vector candidate list for the current block includes a number of block vector predictor candidates that is less than the threshold, a first predefined default block vector in the block vector candidate list for the current block;

means for determining, based on including the first predefined default block vector in the block vector candidate list for the current block, whether the block vector candidate list for the current block includes a number of block vector predictor candidates that is less than the threshold;

means for including, responsive to determining that the block vector candidate list for the current block includes a number of block vector predictor candidates that is less than the threshold, a second predefined default block vector in the block vector candidate list for the current block; and means for determining that a block vector is not available for use as a block vector predictor candidate for the current block where the block vector is identical to a block vector predictor candidate already included in the block vector candidate list for the current block;

means for selecting a particular block vector predictor candidate from the plurality of block vector predictor candidates;

means for generating a syntax element that indicates the particular block vector predictor candidate; and means for including, in an encoded video bitstream, the syntax element.

23. A computer-readable storage medium storing instructions that, when executed, cause one or more processors of a device to decode video data using Intra Block Copy (BC) by at least causing the one or more processors to:

construct a block vector candidate list for a current block of the video data, the block vector candidate list comprising a plurality of block vector predictor candidates, wherein each respective block vector predictor candidate of the plurality of block vector predictor candidates is one of: a block vector of a neighboring block, a block vector of a previously coded block, and a predefined default block vector, wherein at least one block vector predictor candidate in the plurality of block vector predictor candidates included in the constructed block vector candidate list is a default block vector, wherein the instructions that cause the one or more processors to construct the block vector candidate list for the current block, comprise instructions that cause the one or more processors to:

include, based on a left neighboring block of the current block including a block vector that is available for use as a block vector predictor candidate for the current block, the block vector of the left neighboring block in the block vector candidate list for the current block;

responsive to determining that the left neighboring block of the current block does not include a block vector that is available for use as a block vector predictor candidate for the current block or that the block vector of the left neighboring block is the same as the predefined default block vector, include, based on an above neighboring block of the current block including a block vector that is available for use as a block vector predictor candidate for the current block, the block vector of the above neighboring block in the block vector candidate list for the current block;

determine, based on one or both of the left neighboring block of the current block or the above neighboring block of the current block not including a block vector that is available for use as a block vector predictor candidate for the current block, whether to include a block vector of a first previously decoded block in the block vector candidate list for the current block based on whether the block vector of the first previously decoded block is available for use as a block vector predictor candidate for the current block;
responsive to determining that the block vector of the first previously decoded block is available for use as a block vector predictor candidate for the current block, include the block vector of the first previously decoded block in the block vector candidate list for the current block;
determine, based on including the block vector of the first previously decoded block in the block vector candidate list for the current block, whether the block vector candidate list for the current block includes a number of block vector predictor candidates that is less than a threshold, wherein the threshold is two;
responsive to determining that the block vector candidate list for the current block includes a number of block vector predictor candidates that is less than the threshold, determine whether to include a block vector of a second previously decoded block in the block vector candidate list for the current block based on whether the block vector of the second previously decoded block is available for use as a block vector predictor candidate for the current block;
responsive to determining that the block vector of the second previously decoded block is available for use as a block vector predictor candidate for the current block, include the block vector of the second previously decoded block in the block vector candidate list for the current block;
determine, based on including the block vector of the second previously decoded block in the block vector candidate list for the current block, whether the block vector candidate list for the current block includes a number of block vector predictor candidates that is less than the threshold;
responsive to determining that the block vector candidate list for the current block includes a number of block vector predictor candidates that is less than the threshold, include a first predefined default block vector in the block vector candidate list for the current block;
determine, based on including the first predefined default block vector in the block vector candidate list for the current block, whether the block vector candidate list for the current block includes a number of block vector predictor candidates that is less than the threshold;
responsive to determining that the block vector candidate list for the current block includes a number of block vector predictor candidates that is less than the threshold, include a second predefined default block vector in the block vector candidate list for the current block; and
determine that a block vector is not available for use as a block vector predictor candidate for the current block where the block vector is identical to a block vector predictor candidate already included in the block vector candidate list for the current block;
determine, based on a syntax element obtained from an encoded video bitstream, a particular block vector predictor candidate from the plurality of block vector predictor candidates;
determine, based on the particular block vector predictor candidate, a value of a block vector that represents a displacement between the current block of video data and a predictor block of video data in a picture in which the current block resides;
determine, based on the value the block vector, the predictor block of video data; and
reconstruct the current block based on the predictor block.

24. A computer-readable storage medium storing instructions that, when executed, cause one or more processors of a device to encode video data using Intra Block Copy (BC) by at least causing the one or more processors to:
construct a block vector candidate list for a current block of the video data, the block vector candidate list comprising a plurality of block vector predictor candidates, wherein each respective block vector predictor candidate of the plurality of block vector predictor candidates is one of: a block vector of a neighboring block, a block vector of a previously coded block, and a predefined default block vector, wherein at least one block vector predictor candidate in the plurality of block vector predictor candidates included in the constructed block vector candidate list is a default block vector, wherein the instructions that cause the one or more processors to construct the block vector candidate list for the current block, comprise instructions that cause the one or more processors to:
include, based on a left neighboring block of the current block including a block vector that is available for use as a block vector predictor candidate for the current block, the block vector of the left neighboring block in the block vector candidate list for the current block;
responsive to determining that the left neighboring block of the current block does not include a block vector that is available for use as a block vector predictor candidate for the current block or that the block vector of the left neighboring block is the same as the predefined default block vector, include, based on an above neighboring block of the current block including a block vector that is available for use as a block vector predictor candidate for the current block, the block vector of the above neighboring block in the block vector candidate list for the current block;
determine, based on one or both of the left neighboring block of the current block or the above neighboring block of the current block not including a block vector that is available for use as a block vector predictor candidate for the current block, whether to include a block vector of a first previously decoded block in the block vector candidate list for the current block based on whether the block vector of the first previously decoded block is available for use as a block vector predictor candidate for the current block;
responsive to determining that the block vector of the first previously decoded block is available for use as a block vector predictor candidate for the current block, include the block vector of the first previously decoded block in the block vector candidate list for the current block;
determine, based on including the block vector of the first previously decoded block in the block vector candidate list for the current block, whether the block vector candidate list for the current block includes a number of block vector predictor candidates that is less than a threshold, wherein the threshold is two;

responsive to determining that the block vector candidate list for the current block includes a number of block vector predictor candidates that is less than the threshold, determine whether to include a block vector of a second previously decoded block in the block vector candidate list for the current block based on whether the block vector of the second previously decoded block is available for use as a block vector predictor candidate for the current block;

responsive to determining that the block vector of the second previously decoded block is available for use as a block vector predictor candidate for the current block, include the block vector of the second previously decoded block in the block vector candidate list for the current block;

determine, based on including the block vector of the second previously decoded block in the block vector candidate list for the current block, whether the block vector candidate list for the current block includes a number of block vector predictor candidates that is less than the threshold;

responsive to determining that the block vector candidate list for the current block includes a number of block vector predictor candidates that is less than the threshold, include a first predefined default block vector in the block vector candidate list for the current block;

determine, based on including the first predefined default block vector in the block vector candidate list for the current block, whether the block vector candidate list for the current block includes a number of block vector predictor candidates that is less than the threshold;

responsive to determining that the block vector candidate list for the current block includes a number of block vector predictor candidates that is less than the threshold, include a second predefined default block vector in the block vector candidate list for the current block; and determine that a block vector is not available for use as a block vector predictor candidate for the current block where the block vector is identical to a block vector predictor candidate already included in the block vector candidate list for the current block;

select a particular block vector predictor candidate from the plurality of block vector predictor candidates;

generate a syntax element that indicates the particular block vector predictor candidate; and include, in an encoded video bitstream, the syntax element.

\* \* \* \* \*